(12) United States Patent
Hashimoto et al.

(10) Patent No.: US 12,166,424 B2
(45) Date of Patent: Dec. 10, 2024

(54) POWER CONVERSION DEVICE THAT PERFORMS SYNCHRONOUS CONTROL OF SWITCHING ELEMENTS TO ACHIEVE SYNCHRONOUS RECTIFICATION

(71) Applicant: OMRON Corporation, Kyoto (JP)

(72) Inventors: Takuro Hashimoto, Kyoto (JP); Hironori Nakada, Kyoto (JP); Yuhki Kamatani, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 197 days.

(21) Appl. No.: 17/802,339

(22) PCT Filed: Dec. 16, 2020

(86) PCT No.: PCT/JP2020/046866
§ 371 (c)(1),
(2) Date: Aug. 25, 2022

(87) PCT Pub. No.: WO2021/181788
PCT Pub. Date: Sep. 16, 2021

(65) Prior Publication Data
US 2023/0095989 A1 Mar. 30, 2023

(30) Foreign Application Priority Data
Mar. 13, 2020 (JP) .................... 2020-044755

(51) Int. Cl.
*H02M 3/335* (2006.01)
*H02M 1/00* (2006.01)

(52) U.S. Cl.
CPC ..... *H02M 3/33592* (2013.01); *H02M 1/0009* (2021.05); *H02M 1/0043* (2021.05); *H02M 3/33573* (2021.05); *H02M 3/33584* (2013.01)

(58) Field of Classification Search
CPC ......... H02M 3/33573; H02M 3/33584; H02M 3/33592; H02M 1/0009; H02M 1/0043
(Continued)

(56) References Cited

U.S. PATENT DOCUMENTS

2004/0136209 A1* 7/2004 Hosokawa .......... H02M 3/3376
363/24
2008/0055942 A1 3/2008 Tao et al.
(Continued)

FOREIGN PATENT DOCUMENTS

AU 2013342516 A1 * 5/2015 .............. H02M 1/12
JP 2002335674 A 11/2002
(Continued)

OTHER PUBLICATIONS

Extended European Search Report issued in European Appln. No. 20924330.2 mailed Feb. 12, 2024.
(Continued)

*Primary Examiner* — Yemane Mehari
(74) *Attorney, Agent, or Firm* — ROSSI, KIMMS & McDOWELL LLP

(57) ABSTRACT

A power converter includes a capacitor for smoothing a voltage entering therein, first and second switching units, a reactor, an isolated transformer, a second capacitor, and a controller for controlling the switching of the first and second switching units. The controller converts direct-current power to alternating-current power via the reactor and the isolated transformer and converts the alternating-current power to direct-current power via the second capacitor. The controller includes a phase-shift operation unit for taking at least any of first switching control signals as a reference signal and for calculating a phase shift that shifts the phase of the reference signal, as well as a logic operation unit for performing a logic operation that takes the signal resulting (Continued)

from shifting the phase of the reference signal by exactly the phase shift as input and for outputting a second switching control signal.

4 Claims, 35 Drawing Sheets

(58) Field of Classification Search
USPC .......................................................... 363/17
See application file for complete search history.

(56) References Cited

U.S. PATENT DOCUMENTS

| | | | |
|---|---|---|---|
| 2016/0087545 A1* | 3/2016 | Higaki | H02M 3/33584 363/17 |
| 2017/0324334 A1 | 11/2017 | Fujihata et al. | |
| 2017/0324335 A1 | 11/2017 | Suetomi et al. | |
| 2017/0324336 A1 | 11/2017 | Suetomi et al. | |
| 2017/0324337 A1 | 11/2017 | Suetomi et al. | |
| 2019/0173387 A1* | 6/2019 | Tanaka | H02M 1/08 |

FOREIGN PATENT DOCUMENTS

| | | |
|---|---|---|
| JP | 2010161917 A | 7/2010 |
| JP | 2017147824 A | 8/2017 |
| JP | 2017204998 A | 11/2017 |
| JP | 2017204999 A | 11/2017 |
| JP | 2017205000 A | 11/2017 |
| JP | 2017205001 A | 11/2017 |

OTHER PUBLICATIONS

Chen et al. "A Novel Zero-Voltage-Switching Push-Pull High-Frequency-Link Single-Phase Inverter" IEEE Journal of Emerging and Selected Topics in Power Electronics. Jun. 1, 2016. pp. 421-434. vol. 4, No. 2. Cited in NPL1.

International Search Report issued in Intl. Appln. No. PCT/JP2020/046866 mailed Feb. 16, 2021. English translation provided.

Written Opinion issued in Intl. Appln. No. PCT/JP2020/046866 mailed Feb. 16, 2021. English translation provided.

* cited by examiner

POWER CONVERSION DEVICE THAT PERFORMS SYNCHRONOUS CONTROL OF SWITCHING ELEMENTS TO ACHIEVE SYNCHRONOUS RECTIFICATION

TECHNICAL FIELD

The present invention relates to a power converter device.

BACKGROUND ART

In recent years, circuit operations of a bidirectional DC-DC converter, which is a power converter device, have been implemented by making use of conduction in a switching element and body diode as disclosed in, for instance, Patent Documents 1 through 4. However, if GaN is employed in the switching element for high-frequency driving in order to reduce the footprint of a transformer, the conduction loss increases due to the characteristics of the body diode. While an external Schottky barrier diode may be provided in parallel with the switching element in order to achieve high efficiency, there is the problem that the cost as well as the circuit surface area increases.

Thus, performing synchronous rectification instead of providing an external Schottky barrier diode is one consideration in order to achieve high efficiency. Despite that, implementing synchronous rectification requires that instantaneous current measurements are performed at high speed and with high precision; further, there is the problem that a high-performance CPU is also required for determining a continuous mode and a discontinuous mode, which similarly increases costs.

PRIOR ART DOCUMENTS

Patent Documents

[Patent Document 1] Japanese Patent Publication No. 2017-204998
[Patent Document 2] Japanese Patent Publication No. 2017-204999
[Patent Document 3] Japanese Patent Publication No. 2017-205000
[Patent Document 4] Japanese Patent Publication No. 2017-205001

SUMMARY OF THE INVENTION

Problems to be Solved by the Invention

In light of the above-described kinds of problems, the present invention aims to provide a highly efficient power converter device capable of achieving synchronous rectification while minimizing cost and without increasing the circuit area.

Means for Solving the Problem

To address the above described problems, the present invention is characterized by:
a power converter device including a capacitor for smoothing a voltage entering therein;
a first switching unit;
a second switching unit;
a reactor;
an isolated transformer;
a second capacitor; and
a controller for controlling the switching of the first switching unit and the second switching unit; and
the controller converting direct-current power to alternating-current power via the reactor and the isolated transformer and converting said alternating-current power to direct-current power via the second capacitor wherein,
the controller includes
a phase-shift operation unit for taking at least any first switching control signal for controlling switching of the first switching unit as a reference signal, and calculating a phase shift that shifts the phase of the reference signal; and
a logic operation unit for performing a logic operation that takes at least one of the signals resulting from shifting the phase of the reference signal by exactly the phase shift as input and outputting a second switching control signal for controlling switching of the second switching unit.

The present invention is capable of taking at least any of first switching control signals for controlling switching of the first switching unit as a reference signal, calculating a phase shift in accordance with the desired control for switching the second switching unit and further performing a logic operation to thereby generate a second switching control signal for controlling switching of the second switching unit. The phase-shift operation unit can make use of the functions of known controllers such as a microcontroller, and the logic operations can be implemented even via simplified hardware such as a circuit that includes a logic gate. Therefore, it is possible to implement synchronous rectification and provide a highly efficient power converter device while minimizing cost and without causing an increase in the circuit area if the phase shift needed for synchronous rectification is calculated and a second switching control signal is generated via a logic operation from a reference signal included in the first switching control signal.

In the case of a bidirectional power converter device, the input and the first switching unit and second switching unit of the present invention may be mutually interchanged in accordance with the input or output.

A power converter device of the present invention includes a bidirectional DC-DC converter; however, the present invention is not limited thereto.

In the present invention,
the controller may include
a continuous-mode determination unit for determining whether the current flowing through the reactor is continuous or is discontinuous.

Hereby, a determination result can be obtained of whether the current flowing through the reactor is continuous or is discontinuous via the continuous-mode determination unit; therefore, a second switching control signal can be generated that is responsive to when the current is discontinuous.

Effect of the Invention

The present invention is able to provide a highly efficient power converter device capable of achieving synchronous rectification while minimizing cost and without increasing the circuit area.

MODE FOR CARRYING OUT THE INVENTION

Example Application

An example application of the present invention is described below with reference to the drawings.

Figure 1:
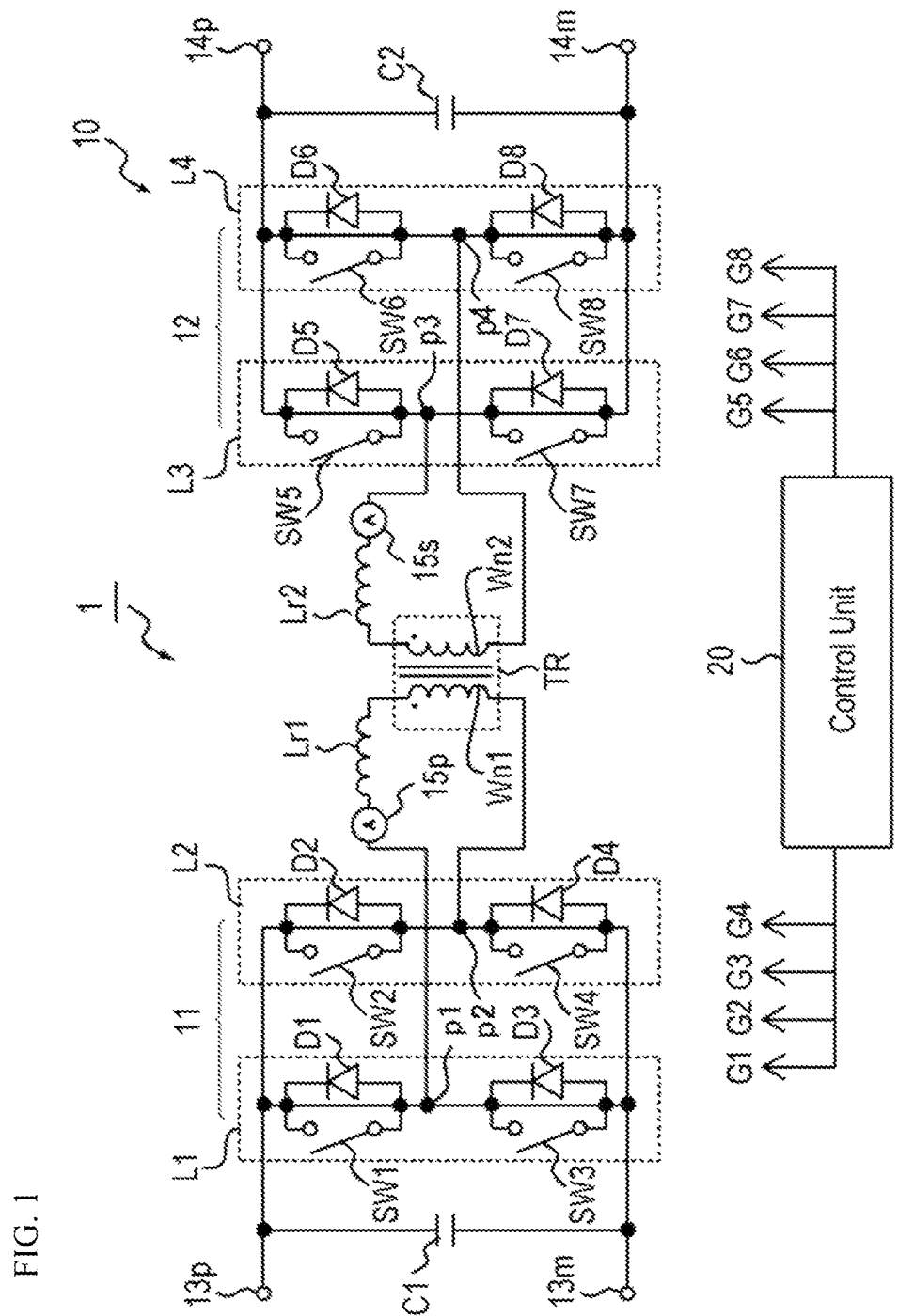
FIG. 1 is a schematic diagram of a power converter device in a first embodiment of the present invention.

The present invention can be applied to a power converter device that includes an isolated bidirectional DC-DC converter 10 which is illustrated in FIG. 1.

The power converter device 1 is provided with the DC-DC converter 10, a control unit 20 and two input-output terminal pairs, i.e., an input-output terminal pair 13 (13$p$, 13$m$) and an input-output terminal pair 14 (14$p$, 14$m$). The capacitors C1 and C2 are connected between the input-output terminals 13$p$, 13$m$ and the input-output terminals 14$p$, 14$m$ to smooth the respective voltages entering therein. Here, the capacitor C1 corresponds to the first capacitor of the present invention. Additionally, the capacitor C2 corresponds to the second capacitor of the present invention. However, the correspondence relationship between the capacitor C1 and the capacitor C2, and the first capacitor and the second capacitor of the present invention may be mutually interchanged depending on the input-output direction.

The DC-DC converter 10 is an isolated bidirectional DC-DC converter constituted by a transformer TR, two reactors Lr1 and Lr2, and two full-bridge circuits 11 and 12 as the primary elements. The reactor Lr1 and reactor Lr2 are controlled by the first full-bridge circuit 11 and the second full-bridge circuit 12 to generate alternating-current power, and the capacitor C1 and capacitor C2 smooths the aforementioned alternating-current power to direct-current power. An isolated transformer may be employed, or a non-isolated transformer may serve as the transformer TR.

The second full-bridge circuit 12 in the DC-DC converter 10 may be provided with a third leg L3 having a fifth switching element SW5 and seventh switching element SW7 that are connected in series and a fourth leg L4 having a sixth switching element SW6 and an eighth switching element SW8 that are connected in series. As illustrated, an n-th diode Dn (n=5-8) is connected in parallel between the terminals of the n-th switching element SWn (n=5-8) of each leg. Both the third leg L3 and fourth leg L4 are connected to the second input-output terminal 14. A connection point p3 of the third leg L3, which is between the fifth switching element SW5 and the seventh switching element SW7, is connected to one end of a second winding Wn2 of the transformer TR via the second reactor Lr2; a connection point p4 of the fourth leg L4, which is between the sixth switching element SW6 and the eighth switching element SW8, is connected to the other end of the second winding Wn2 of the transformer TR. Here, the first full-bridge circuit 11 corresponds to the first switching unit of the present invention. The second full-bridge circuit 12 corresponds to the second switching unit of the present invention.

Figure 2:
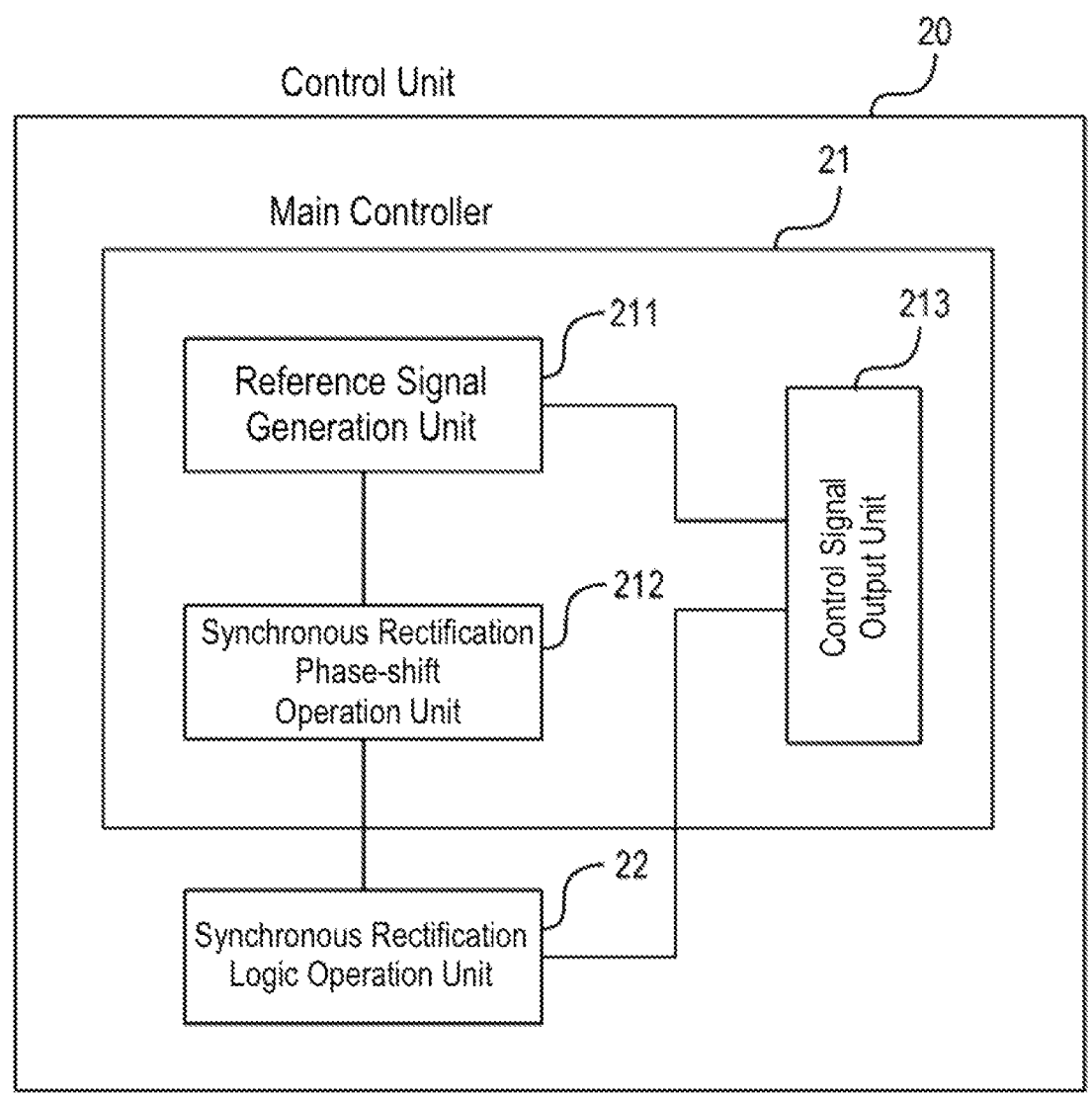
FIG. 2 is a block diagram of a control unit in the power converter device according to the first embodiment of the present invention.

FIG. 2 is a block diagram of a control unit 20 in the DC-DC converter 10 according to this embodiment. The control unit 20 includes a primary controller 21 configured from a microcontroller or the like, and a synchronous rectification logic operation unit 22 constituted by an analog circuit or small-factor CPU, or the like. The primary controller 21 also includes a reference signal generator 211, a synchronous rectification phase shift operation unit 212, and a control signal output unit 213.

Figure 3:
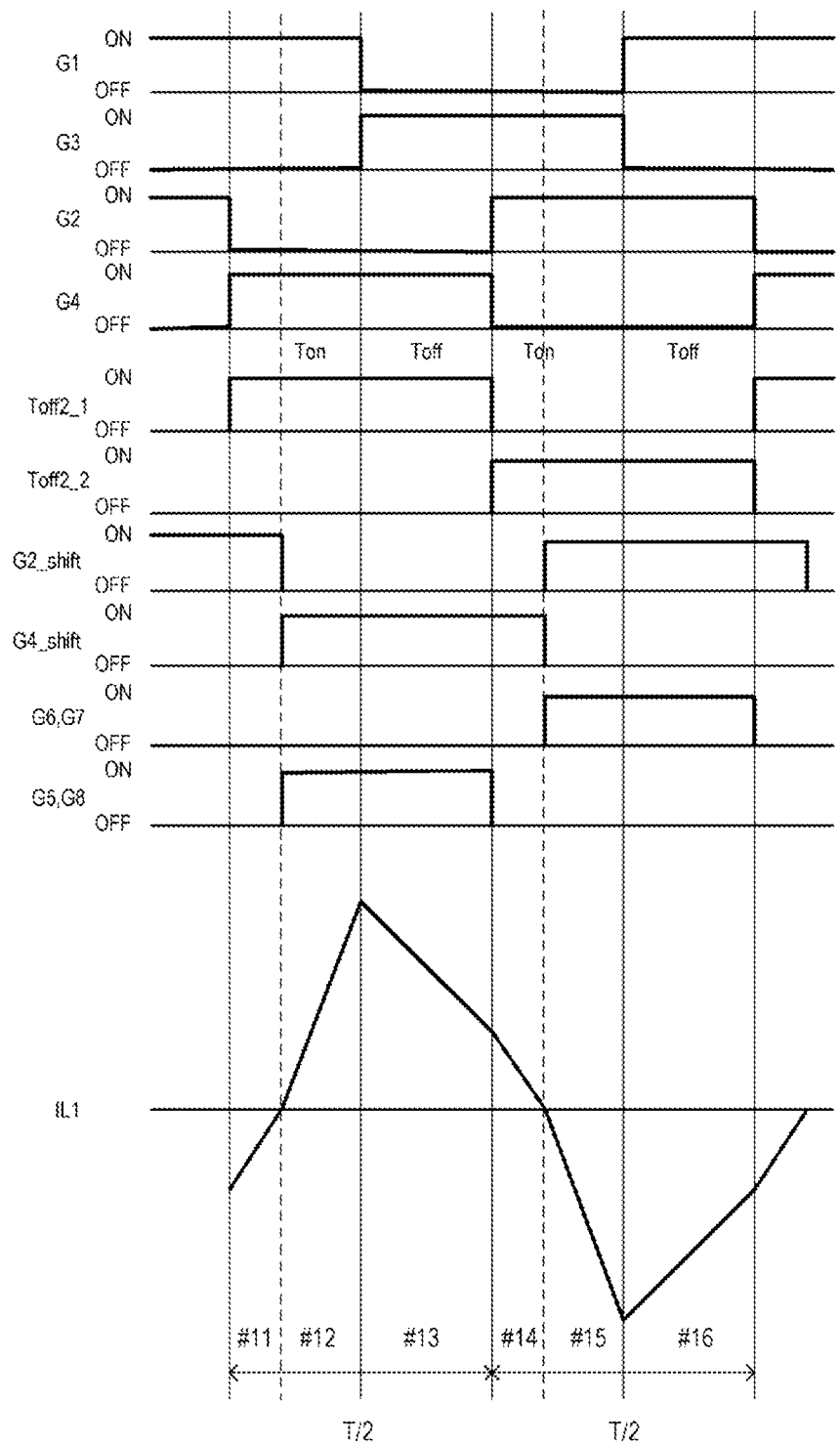
FIG. 3 is a timing chart for control signals for a buck mode of a DC-DC converter according to the first embodiment of the present invention.

FIG. 3 is a timing chart for signals used when the DC-DC converter 10 is operated as a buck converter.

The signal Toff2_1 results from delaying the phase of the base control signal G2 by half cycle and further forwarding the resulting phase by exactly $f_1$(T, TON, Vin, Vout), while the signal Toff2_2 results from inverting the phase of Toff2_1. Here, T represents the cycle, TON is an ON period where the base control signals G1 and G4 are on simultaneously, TOFF is an ON period where base control signals G2 and G3 are on simultaneously, Vin is the input voltage of the DC-DC converter 10, Vout is the output voltage of the DC-DC converter 10, $f_1$(T, TON, Vin, Vout) is a predetermined function with T, TON, Vin, Vout as variables, where negative values are excluded.

The signal G2_shift results from delaying the phase of the reference control signal G2 by exactly $f_2$(T, TON, Vin, Vout), and the signal G4_shift results from inverting the phase of G2_shift. Here, f2 (T, TON, Vin, Vout) is a predetermined function with T, TON, Vin, Vout as variables where the negative values are excluded.

The functions f1 (T, TON, Vin, Vout) and f2 (T, TON, Vin, Vout) correspond to the synchronous rectification phase shift in the present invention. A zero current interval and a regeneration interval are calculated during discontinuous mode and continuous mode, and taken as a synchronous rectification phase shift.

Figure 4A:
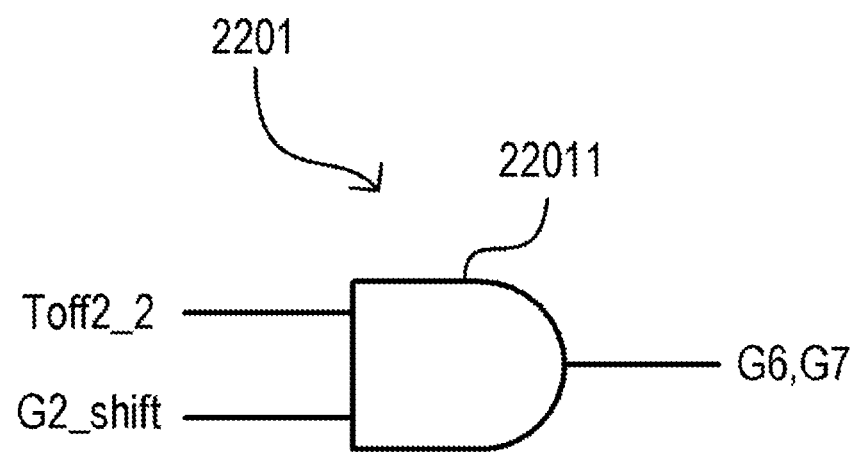
FIGS. 4A and 4B are diagrams illustrating examples of logic operation circuits according to the first embodiment of the present invention.
Figure 4B:
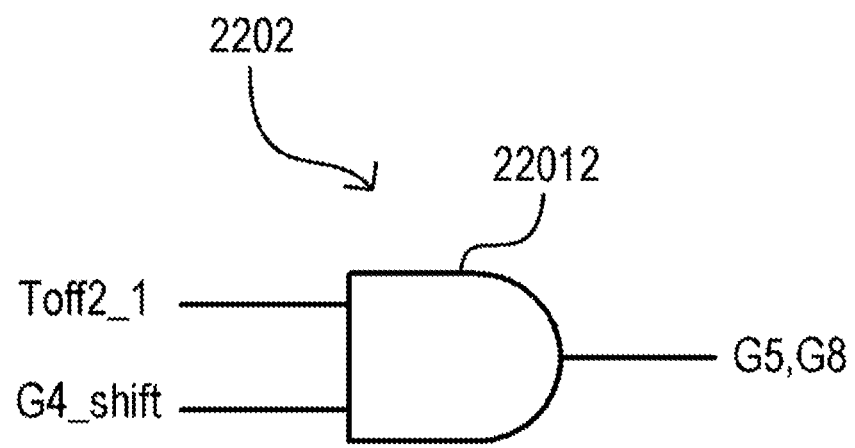

The control signals G6 and G7 are a logical conjunction of the signal Toff2_2 and the signal G2_shift performed via the AND gate 22011 as illustrated in FIG. 4(A). The logic operation circuit 2201 is provided to the synchronous rectification logic operation unit 22. The control signals G5 and G8 are similarly a logical conjunction of the signal Toff2_1 and the signal G4_shift performed via the AND gate 22012 as illustrated in FIG. 4(B). The logic operation circuit 2202 is provided to the synchronous rectification logic operation unit 22.

The control signals G1-G8 thus generated are output from the control signal output unit 213. The reactor current IL1 resulting when the DC-DC converter 10 is driven by the control signals G1-G8 is illustrated at the lowest part of FIG. 3. The DC-DC converter 10, at this point, transitions through the below-listed states #11 through #16 in that order. Synchronous rectification is achieved in states #12, #13, #15, and #16.

Thus, a power converter device 1 that includes the DC-DC converter 10 can generate the control signals that perform synchronous control of the switching elements SW5-SW8 from a reference signal (in this case G2) via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

First Embodiment

A power converter device 1 according to an embodiment of the present invention is described in detail below using the drawings.

<Configuration of the Power Converter Device>

FIG. 1 illustrates a schematic of the power converter device 1 according to an embodiment of the present invention.

The power converter device 1 according to this embodiment is a device capable of bidirectional power conversion. As illustrated, the power converter device 1 is provided with the DC-DC converter 10, a control unit 20 and two input-output terminal pairs, i.e., an input-output terminal pair 13 (13p, 13m) and an input-output terminal pair 14 (14p, 14m). Within the input-output terminal pairs 13 and 14, the input-output terminals 13p, 14p are the high electrical-potential side and the input-output terminals 13m, 14m are the low electrical potential side. A capacitor C1 is connected between the input-output terminals 13p, 13m for smoothing the input-output voltage. A capacitor C2 is similarly connected between the input-output terminals 14p, 14m for smoothing the input-output voltage. Electrolytic capacitors can be employed as the capacitor C1 and C2.

The DC-DC converter 10 is an isolated bidirectional DC-DC converter constituted by a transformer TR, two reactors Lr1 and Lr2, and two full-bridge circuits 11 and 12 as the primary elements. Hereafter, the full-bridge circuit 11 on the left side and the full-bridge circuit 12 on the right side of FIG. 1 are denoted as a first full-bridge circuit 11 and a second full-bridge circuit 12, respectively. The reactors Lr1 and Lr2 on the left side and right side of FIG. 1 are denoted as a first reactor Lr1 and a second reactor Lr2 respectively; the winding Wn1 on the left side and the winding Wn2 on the right side of the transformer TR in FIG. 1 are denoted as a first winding Wn1 and a second winding Wn2, respectively. Additionally, the input-output terminal pair 13 (13p, 13m) and input-output terminal pair 14 (14p, 14m) on the left side and right side of FIG. 1 are denoted as a first input-output terminal pair 13 and a second input-output terminal pair 14, respectively. The first reactor Lr1 and second reactor Lr2 may utilize the leak inductance from the first winding Wn1 and second winding Wn2 in the transformer TR. Note that turn ratio of the transformer TR in the DC-DC converter 10 does not need to be 1:1. However, hereafter, the configuration and operation of the power converter device 1 are described assuming the transformer TR has a turn ratio of 1:1.

The first full-bridge circuit 11 in the DC-DC converter 10 may be provided with a first leg L1 having a first switching element SW1 and third switching element SW3 that are connected in series and a second leg L2 having a second switching element SW2 and a fourth switching element SW4 that are connected in series. As illustrated, an n-th diode Dn (n=1-4) is connected in parallel between the terminals of the n-th switching element SWn (n=1-4) of each leg. Each leg is also connected to the first input-output terminal pair 13, and a connection point p1, which is between the first switching element SW1 and third switching element SW3 of the first leg L1, is connected to one end of the first winding Wn1 in the transformer TR via the first reactor Lr1. A connection point p2, which is between the second switching element SW2 and the fourth switching element SW4 in the second leg L2, is connected to the other end of the first winding Wn1 in the transformer TR.

The second full-bridge circuit 12 in the DC-DC converter 10 may be provided with a third leg L3 having a fifth switching element SW5 and seventh switching element SW7 that are connected in series and a fourth leg L4 having a sixth switching element SW6 and an eighth switching element SW8 that are connected in series. As illustrated, an n-th diode Dn (n=5-8) is connected in parallel between the terminals of the n-th switching element SWn (n=5-8) of each leg. Both the third leg L3 and fourth leg L4 are connected to the second input-output terminal 14. A connection point p3 of the third leg L3, which is between the fifth switching element SW5 and the seventh switching element SW7, is connected to one end of a second winding Wn2 of the transformer TR via the second reactor Lr2; a connection point p4 of the fourth leg L4, which is between the sixth switching element SW6 and the eighth switching element SW8, is connected to the other end of the second winding Wn2 of the transformer TR.

While gallium nitride (GaN), silicon (Si), and silicon carbide (SiC), etc., may be used as the semiconductor material of the switching elements SW1-SW8, the semiconductor materials are not limited thereto. A Metal Oxide Semiconductor Field Effect Transistor (MOSFET), Insulated Gate Bipolar Transistor (IGBT), etc., may be used as a semiconductor switching element. The diodes D1-D8 are connected in reverse parallel with respect to these semiconductor materials which can used for the switching elements SW1-SW8.

Current sensors 15p, 15s may be installed in the DC-DC converter 10 for measuring the size of the respective currents flowing through the first reactor Lr1 and the second reactor Lr2. Various sensors (not shown) may be installed in the DC-DC converter 10 for measuring the input-output voltage or output current.

The control unit 20 modifies the level of the control signal to the switching elements in the DC-DC converter 10 to control the DC-DC converter 10 (i.e., the on/off of the switching elements in the DC-DC converter 10). Hereafter, a control signal used for an n-th switching element SWn (n=1-8) is denoted as a control signal Gn.

The control unit 20 is constituted by a processor (in this embodiment, a microcontroller), a gate driver, etc., and the outputs of the above-mentioned sensors (current sensor 15p, 15s, etc.) enter the control unit 20.

The control unit 20 is configured (programmed) to select from the four below-mentioned converter modes to cause the DC-DC converter 10 to operate on the basis of the data (current value, voltage setting) entering therein, and to control the DC-DC converter 10 to cause the DC-DC converter 10 to operate in the converter mode selected.

The first input-output terminal pair 13 as a boost converter on the primary side;
the first input-output terminal pair 13 as a buck converter on the primary side;
the second input-output terminal pair 14 as a boost converter on the primary side; and
the second input-output terminal pair 14 as a buck converter on the primary side.

The control unit 20 is configured (programmed) to changing the particulars of control with respect to the DC-DC converter 10 immediately (after control to cause the first input-output terminal pair 13 in the DC-DC converter 10 to operate as a boost converter on the primary side, changing to a control, etc., to cause the second input-output terminal pair 14 in the DC-DC converter 10 to operate as a buck converter on the primary side).

<Synchronous Rectification Process>

A concrete description of the configuration and operation of the power converter device 1 according to this embodiment is given below.

FIG. 2 is a block diagram of a control unit 20 in the DC-DC converter 10 according to this embodiment. The control unit 20 includes a primary controller 21 configured from a microcontroller or the like, and a synchronous rectification logic operation unit 22 constituted by an analog circuit or small-factor CPU, or the like. The primary controller 21 also includes a reference signal generator 211, a synchronous rectification phase shift operation unit 212, and a control signal output unit 213. The specific functions of these parts are described later.

<Buck Mode 1>

FIG. 3 is a timing chart for signals used when the DC-DC converter 10 of this embodiment is operated as a buck converter. The control unit 20 generates control signals for the four switching elements SW5-SW8 in the second full-bridge circuit 12 on the secondary side from the control signals G1-G4 for the four switching elements SW1-SW4 in the first full-bridge circuit 11 on the primary side of the DC-DC converter 10. Therefore, the control signals with respect to the switching elements SW1-SW8 which are the basis for generating the control for achieving the operations of the DC-DC converter 10 of this embodiment, are referred to as base control signals. The control signals among the base control signals for the switching elements SW1-SW4 in the first full-bridge circuit 11 are unchanged and are used unchanged as control signals, while the control signals for the switching elements SW5-SW8 in the second full-bridge circuit 12 are generated by processing, e.g., phase shifting, or the like, relative to G2 among the base control signals. Therefore, the base control signals that would be subject to signal processing when generating synchronous rectification control signals are referred to as reference signals in particular. The reference signal generator 211 outputs the reference signals from the base control signals which include the control signals for the switching elements SW1-SW4 in the first full-bridge circuit 11 to the synchronous rectification phase-shift operation unit 212. The reference signal generator 211 outputs the control signals that will be used unchanged as control signals to the control signal output unit 213. In the example illustrated in FIG. 3, the top four timing charts are base control signal timing charts.

In the example illustrated in FIG. 3, G2 is selected as the reference signal.

The signal Toff2_1 results from delaying the phase of the base control signal G2 by half cycle and further forwarding the resulting phase by exactly $f_1(T, TON, Vin, Vout)$, while the signal Toff2_2 results from inverting the phase of Toff2_1. Here, T represents the cycle, TON is an ON period where the base control signals G1 and G4 are on simultaneously, TOFF is an ON period where base control signals G2 and G3 are on simultaneously, Vin is the input voltage of the DC-DC converter 10, Vout is the output voltage of the DC-DC converter 10, and $f_1(T, TON, Vin, Vout)$ is a predetermined function with T, TON, Vin, Vout as variables, where negative values are excluded.

The signal G2_shift results from delaying the phase of the reference control signal G2 by exactly $f_2(T, TON, Vin, Vout)$, and the signal G4_shift results from inverting the phase of G2_shift. Here, $f_2(T, TON, Vin, Vout)$ is a predetermined function with T, TON, Vin, Vout as variables where the negative values are excluded.

The synchronous rectification phase shift operation unit 212 calculates $f_1(T, TON, Vin, Vout)$ and $f_2(T, TON, Vin, Vout)$, phase-shifts the reference signal and outputs the signal generated to the synchronous rectification logic operation unit 22. The synchronous rectification phase shift may be a zero current interval during discontinuous mode and a regeneration interval during continuous mode. An operation for a synchronous rectification phase shift thusly configured may be performed for each cycle of a reference signal.

The control signals G6 and G7 are a logical conjunction of the signal Toff2_2 and the signal G2_shift performed via the AND gate 22011 as illustrated in FIG. 4(A). The logic operation circuit 2201 is provided to the synchronous rectification logic operation unit 22. The control signals G5 and G8 are similarly a logical conjunction of the signal Toff2_1 and the signal G4_shift performed via the AND gate 22012 as illustrated in FIG. 4(B). The logic operation circuit 2202 is provided to the synchronous rectification logic operation unit 22. A control signal output by the synchronous rectification logic operation unit 22 is output to the control signal output unit 213 and used in controlling the switching elements.

The control signals G1-G8 thus generated are output from the control signal output unit 213. The reactor current IL1 resulting when the DC-DC converter 10 is driven by the control signals G1-G8 is illustrated at the lowest part of FIG. 3. The DC-DC converter 10, at this point, transitions through the below-listed states #11 through #16 in that order. The reactor current IL1 may be the current flowing through the reactor Lr1 which is measured by the current sensor 15p or, the secondary side reactor Lr2 may be converted to a primary side reactor and the reactor current IL1 may be the current flowing through a reactor equivalent to combining the reactor Lr1 and reactor Lr2.

Figure 5:
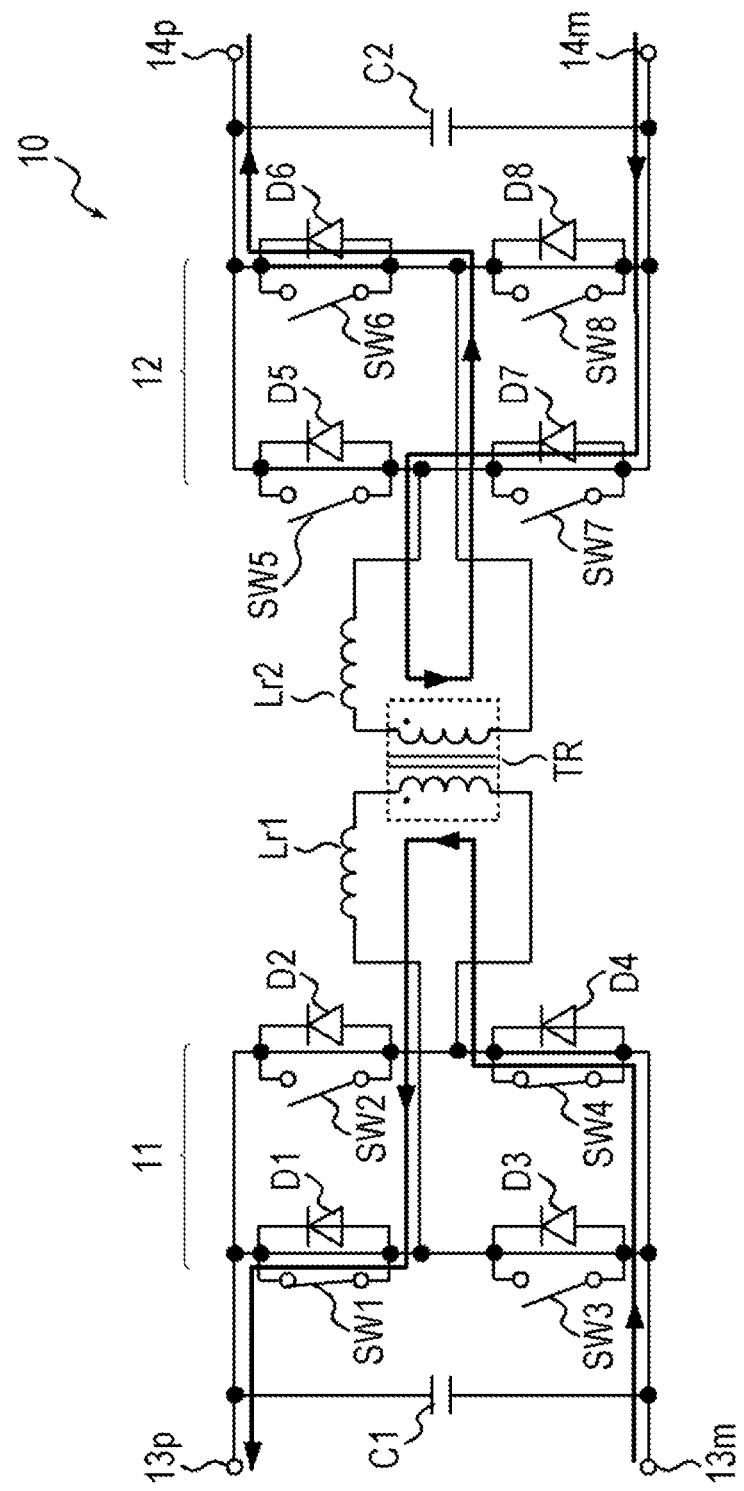
FIG. 5 is a diagram illustrating a current path during a buck mode for a DC-DC converter according to first embodiment of the present invention.

In state #11, only the switching elements SW1 and SW4 are ON and the other switching elements are OFF. At this point, the path of the current through the DC-DC converter 10 is as illustrated in FIG. 5.

Figure 6:
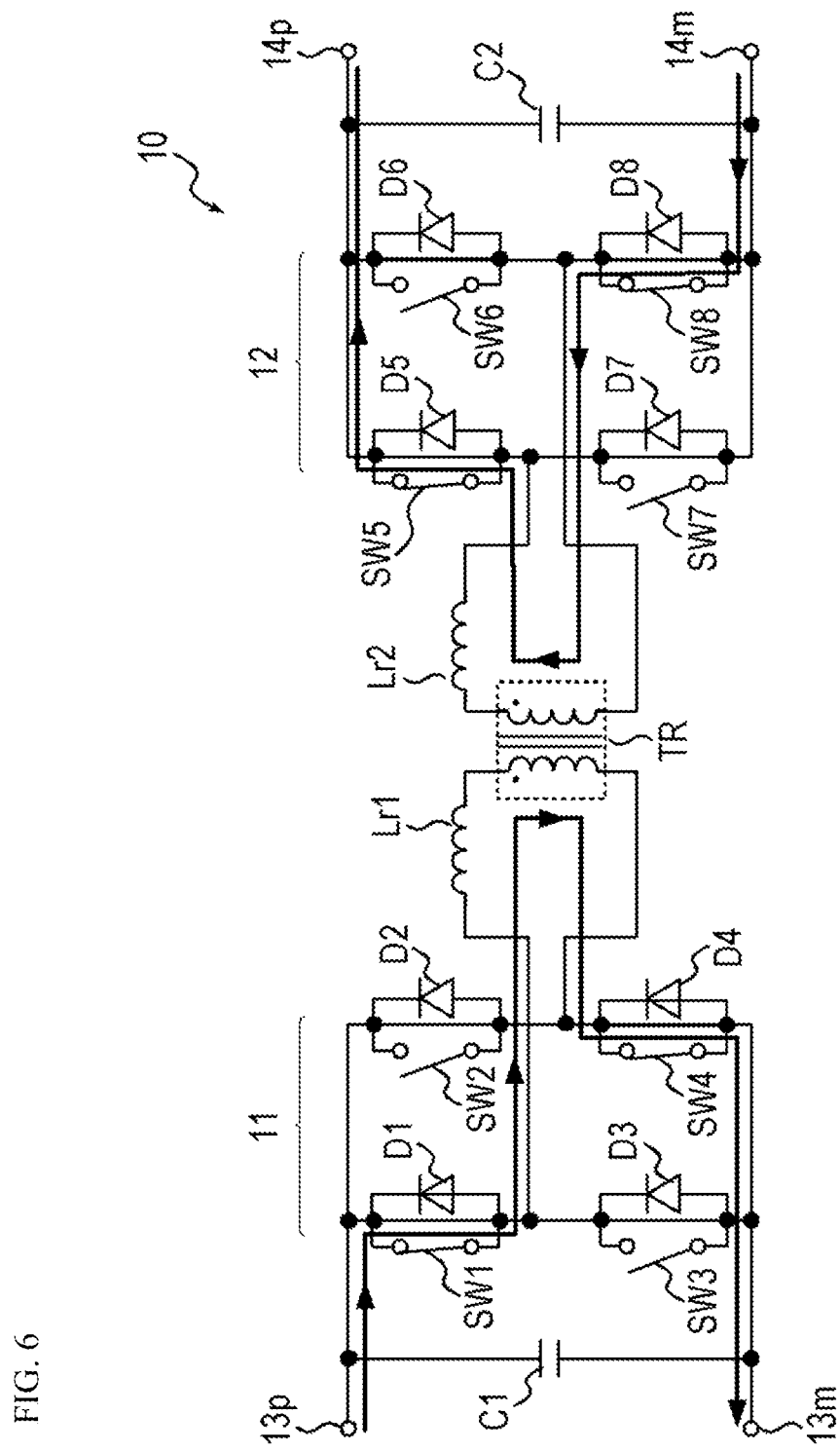
FIG. 6 is a diagram illustrating a current path in buck mode for a DC-DC converter according to first embodiment of the present invention.

In state #12, the switching elements SW1, SW4, SW5, and SW8 are ON and the other switching elements are OFF. At this point, the path of the current through the DC-DC converter 10 is as illustrated in FIG. 6.

Figure 7:
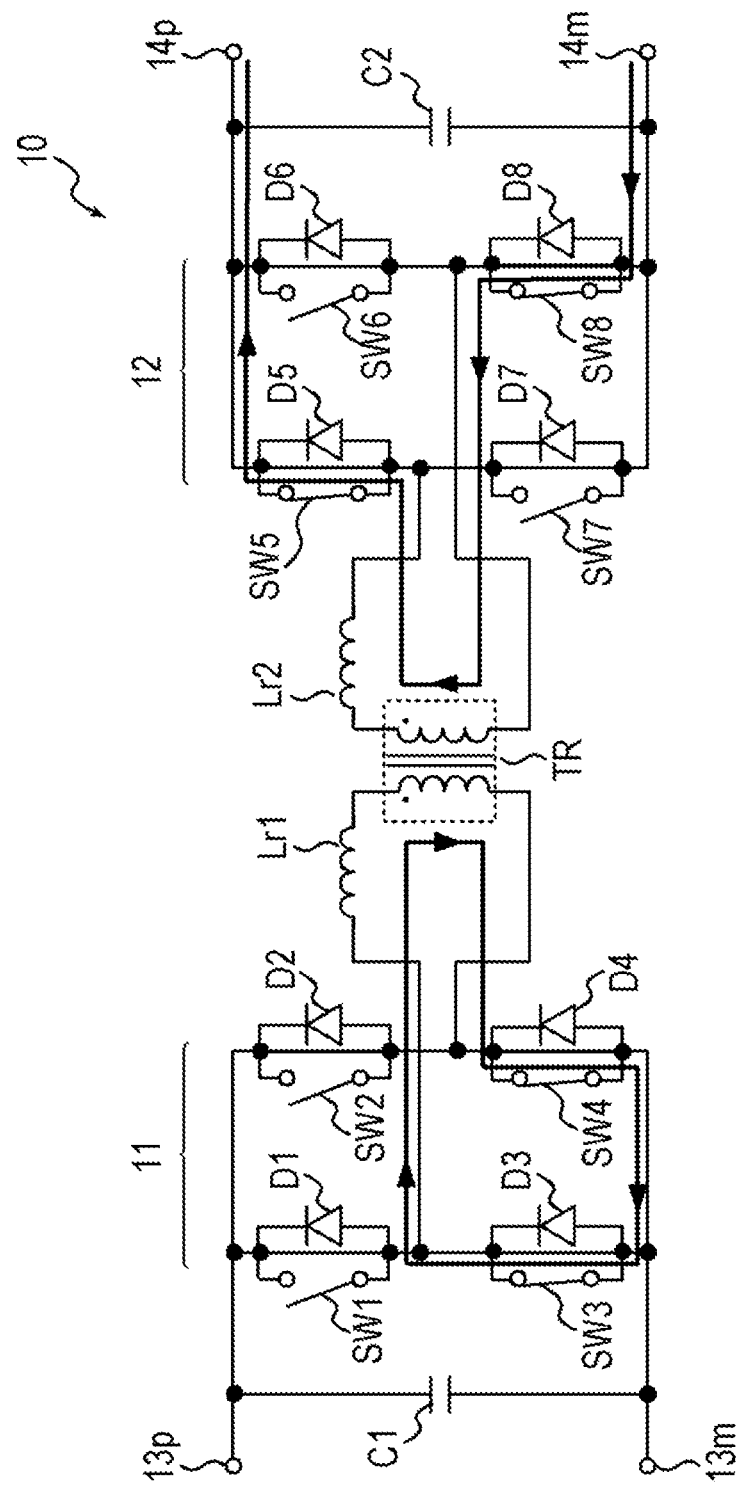
FIG. 7 is a diagram illustrating a current path in buck mode for a DC-DC converter according to first embodiment of the present invention.

In state #13, the switching elements SW3, SW4, SW5, and SW8 are ON and the other switching elements are OFF. At this point, the path of the current through the DC-DC converter 10 is as illustrated in FIG. 7.

Figure 8:
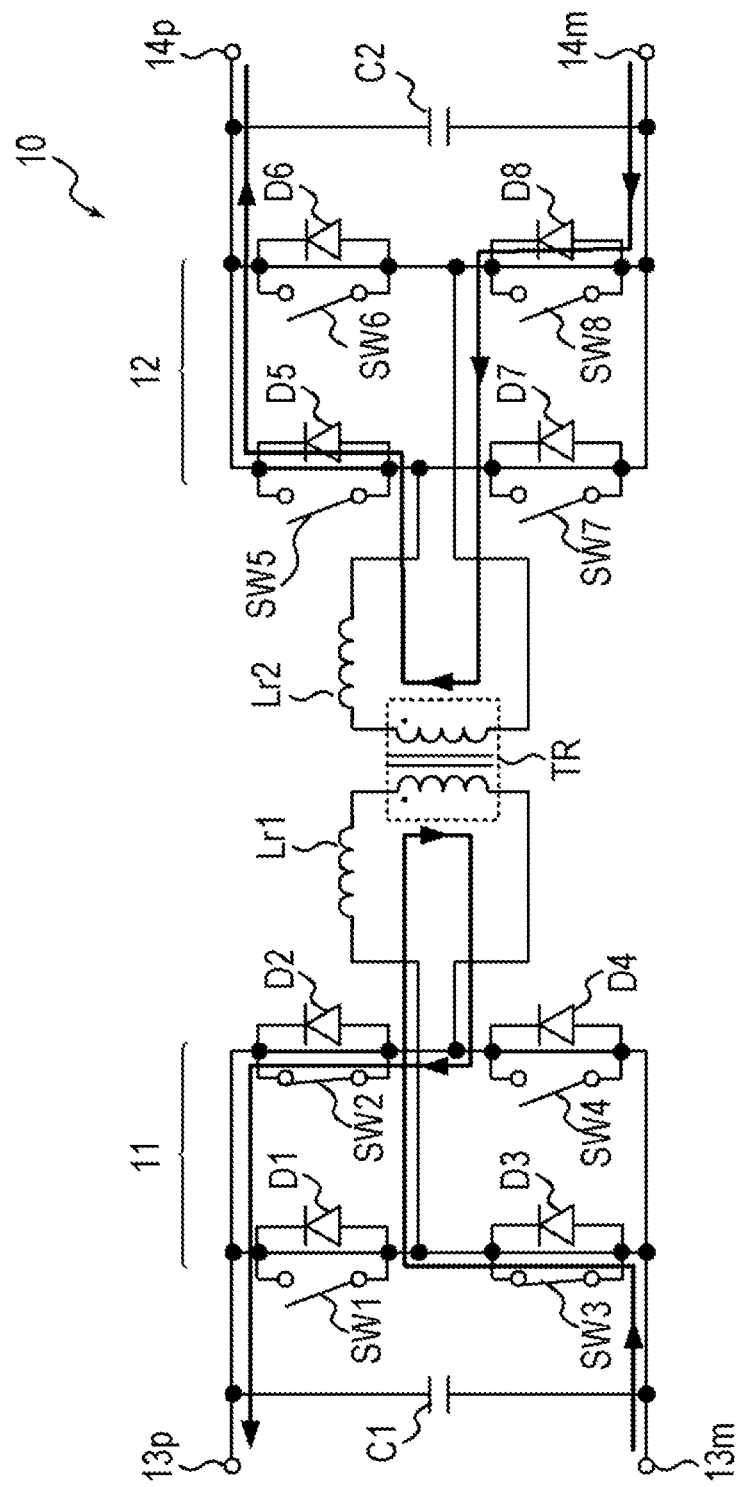
FIG. 8 is a diagram illustrating a current path in buck mode for a DC-DC converter according to first embodiment of the present invention.

In state #14, only the switching elements SW2 and SW3 are ON and the other switching elements are OFF. At this point, the path of the current through the DC-DC converter 10 is as illustrated in FIG. 8.

Figure 9:
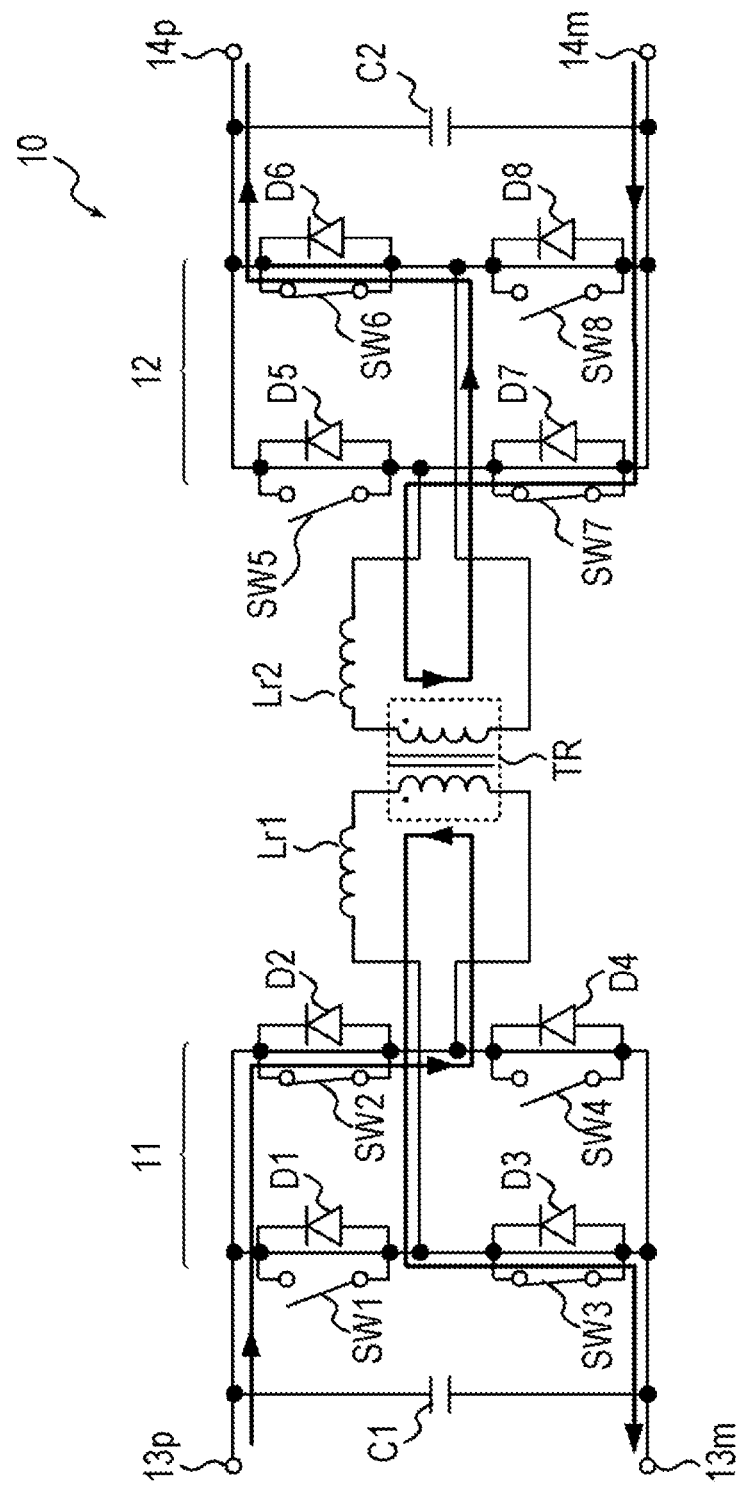
FIG. 9 is a diagram illustrating a current path in buck mode for a DC-DC converter according to first embodiment of the present invention.

In state #15, the switching elements SW2, SW3, SW6, and SW7 are ON and the other switching elements are OFF. At this point, the path of the current through the DC-DC converter 10 is as illustrated in FIG. 9.

Figure 10:
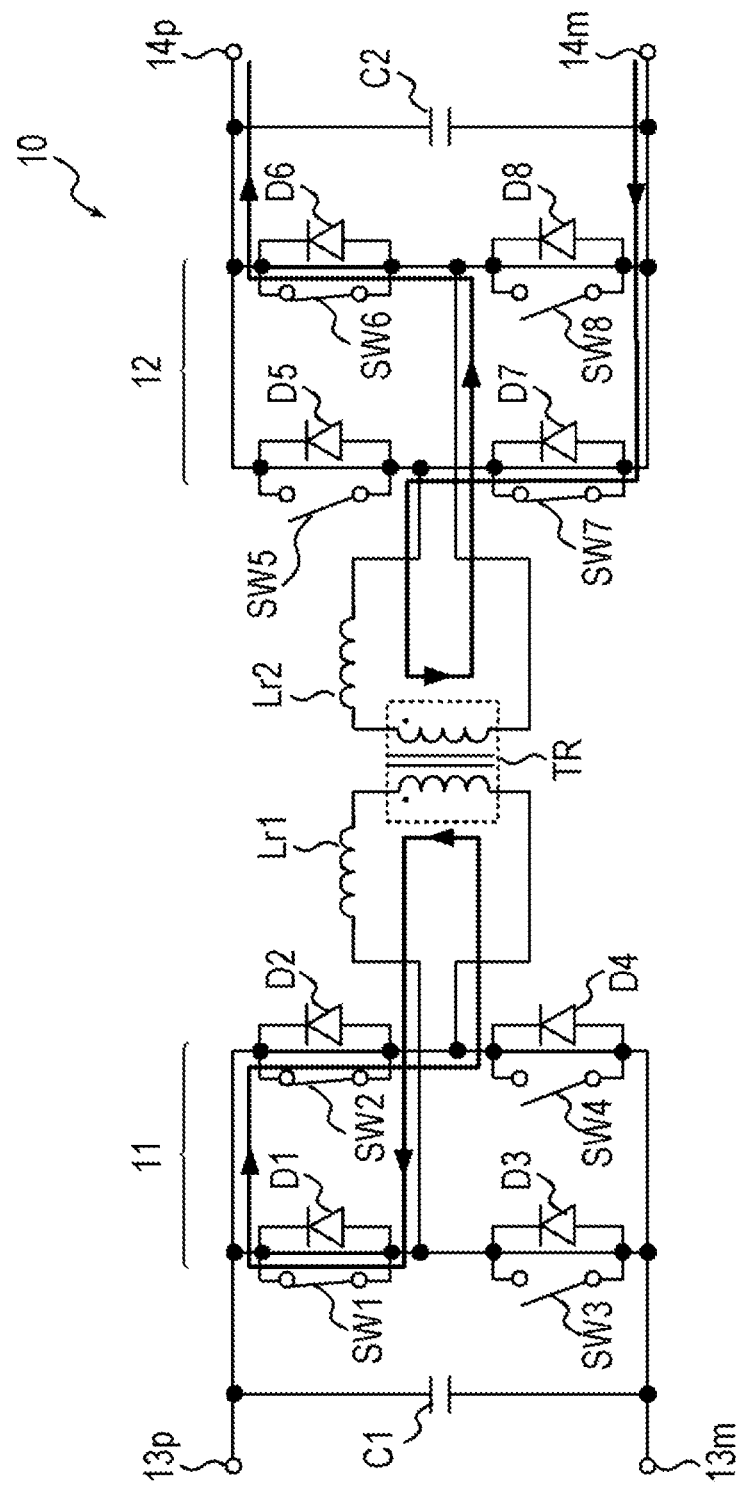
FIG. 10 is a diagram illustrating a current path in buck mode for a DC-DC converter according to first embodiment of the present invention.

In state #16, the switching elements SW1, SW2, SW6, and SW7 are ON and the other switching elements are OFF. At this point, the path of the current through the DC-DC converter 10 is as illustrated in FIG. 10.

Synchronous rectification is thus achieved in states #12, #13, #15, and #16. No synchronous rectification is achieved in states #11 and #14; however, the period of these states is short, with no great losses during these periods.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Buck Mode 2>

Figure 11:
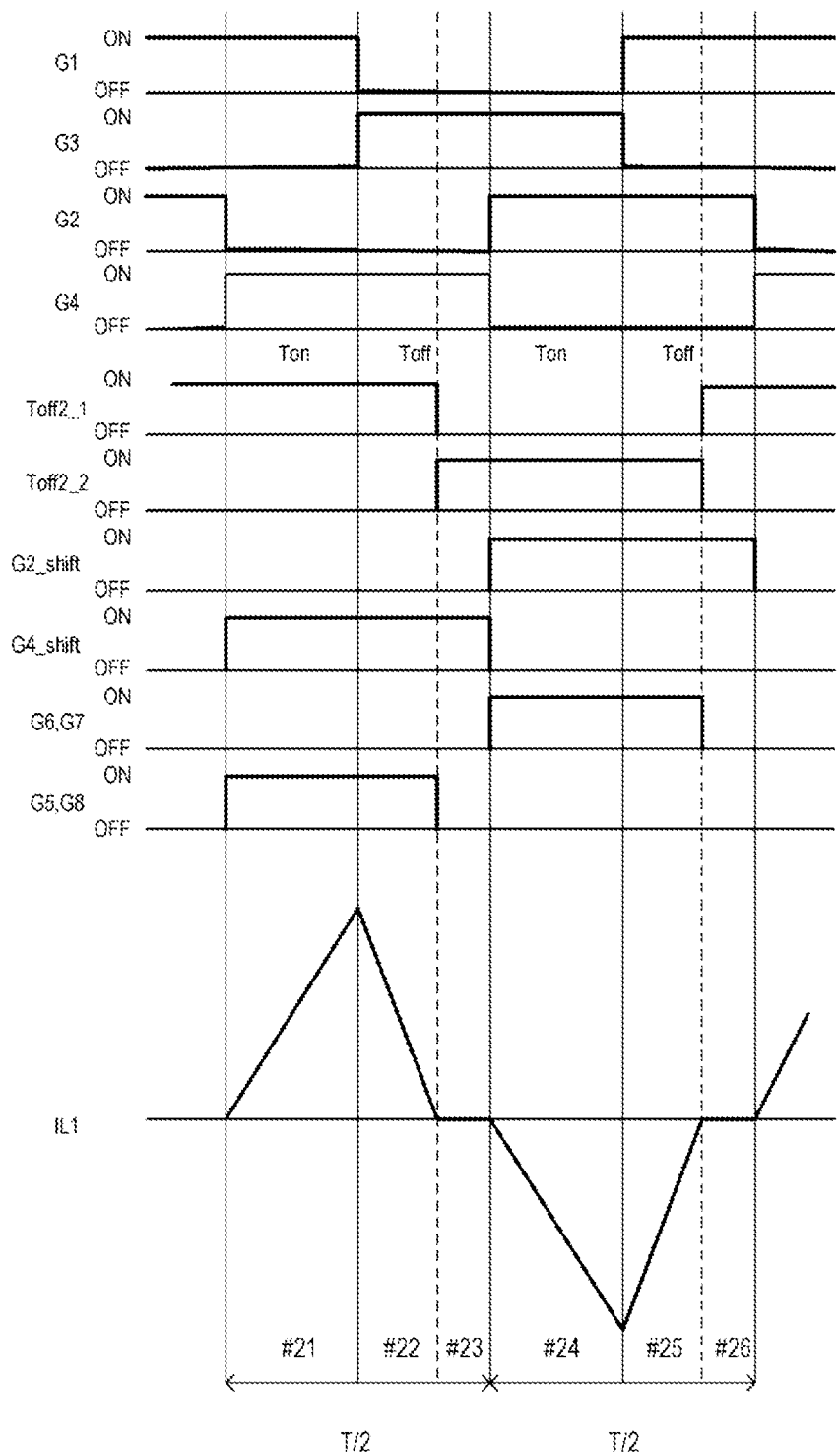
FIG. 11 is a timing chart for control signals for another buck mode of a DC-DC converter according to the first embodiment of the present invention.

FIG. 11 is an example where the reactor current IL1 becomes discontinuous during the buck mode due to an input-output condition.

In the example illustrated in FIG. 11, G2 is selected as the reference signal.

Here as well, the signal Toff2_1 results from delaying the phase of the base control signal G2 by half cycle and further forwarding the resulting phase by exactly $f_1$(T, TON, Vin, Vout), while the signal Toff2_2 results from inverting the phase of Toff2_1.

The signal G2_shift results from delaying the phase of the reference control signal G2 by exactly $f_2$(T, TON, Vin, Vout), and the signal G4_shift results from inverting the phase of G2_shift.

The control signals G6 and G7 are a logical conjunction of the signal Toff2_2 and the signal G2_shift performed via the AND gate 22011 as illustrated in FIG. 4(A). The logic operation circuit 2201 is provided to the synchronous rectification logic operation unit 22. The control signals G5 and G8 are similarly a logical conjunction of the signal Toff2_1 and the signal G4_shift performed via the AND gate 22012 as illustrated in FIG. 4(B). The logic operation circuit 2202 is provided to the synchronous rectification logic operation unit 22. The logic operation circuits 2201 and 2202 which generate the control signals G5-G8 in buck mode 2 operate similarly as in buck mode 1.

The control signals G1-G8 thus generated are output from the control signal output unit 213. The reactor current IL1 resulting when the DC-DC converter 10 is driven by the control signals G1-G8 is illustrated at the lowest part of FIG. 11. The DC-DC converter 10, at this point, transitions through the states #21 through #26 in that order. Descriptions of the current paths in the DC-DC converter 10 in each state are omitted; however, synchronous rectification is achieved except for when states #23 and #26 become discontinuous.

A power converter device 1 that thus includes the DC-DC converter 10 can generate the control signals that perform synchronous control of the switching elements SW5-SW8 from reference control signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Boost Mode 1>

Figure 12:
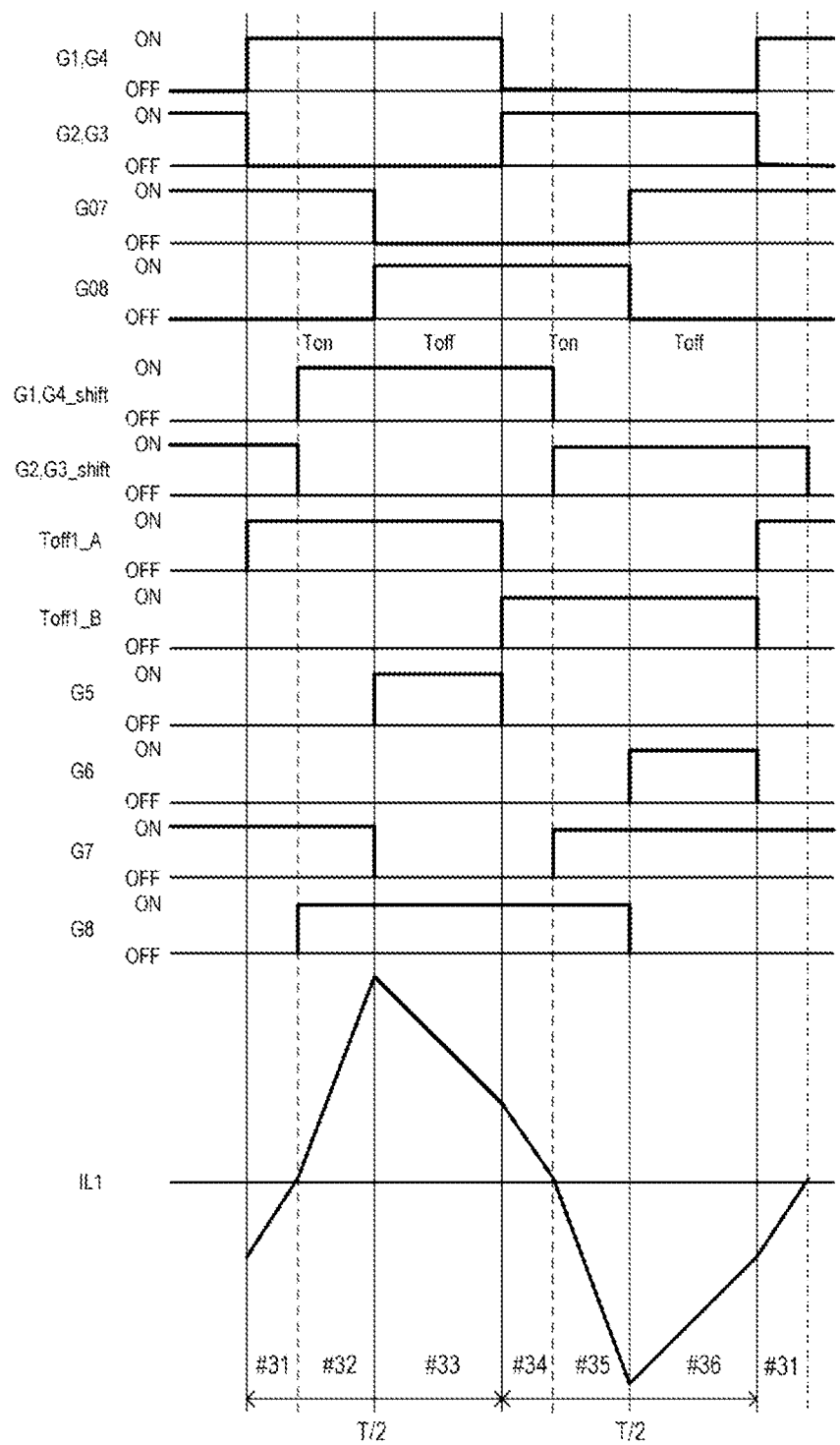
FIG. 12 is a timing chart for control signals for boost mode of a DC-DC converter according to the first embodiment of the present invention.

FIG. 12 is a timing chart for signals used when the DC-DC converter 10 of this embodiment is operated as a boost converter. The control signals G1-G4 for the four switching elements SW1-SW4 in the first full-bridge circuit 11 on the primary side of the DC-DC converter 10 and the control signals G7 and G8 for SW7 and SW8 are taken as base control signals with the control signals generated therefrom for the four switching elements SW5-SW8 in the second full-bridge circuit 12 on the secondary side. The control signals among the base control signals for the switching elements SW1-SW4 in the first full-bridge circuit 11 are unchanged and are used unchanged as control signals, while the control signals for the switching elements SW5-SW8 in the second full-bridge circuit 12 are generated by processing, e.g., phase shifting relative to G2 among the base control signals, as well as a logic operation where G07, G08 which are base control signals for the switching elements SW7, SW8 are entered respectively as an input. The control signals for the switching elements SW7, SW8 are generated through processing of the base control signals; therefore, the base control signals for the switching elements SW7, SW8 are denoted as G07, G08, and when finally generated the control signals used in controlling the switching elements SW7, SW8 are denoted as G7, G8. Therefore, the base control signals that would be subject to signal processing when generating synchronous rectification control signals are referred to as reference signals in particular. The top four timing charts for G1-G4, and G07, G08 in FIG. 12 are for reference signals.

The signal G1,4_shift results from delaying the phase of the reference control signal G1 by exactly $f_3$(T, TON, Vin, Vout), and the signal G2,3_shift results from inverting the phase of G1,4_shift. Here, $f_3$(T, TON, Vin, Vout) is a predetermined function with T, TON, Vin, Vout as variables where the negative values are excluded.

The signal Toff1_A results from delaying the phase of the base control signal G2 by half cycle and further forwarding the resulting phase by exactly $f_4$(T, TON, Vin, Vout), while the signals Toff1_B results from inverting the phase of Toff1_A. Here, T represents the cycle, TON is an ON period where the base control signals G1, G4, and G7 are on simultaneously, TOFF is an ON period where base control signals G1, G4, and G8 are on simultaneously, Vin is the input voltage of the DC-DC converter 10, Vout is the output voltage of the DC-DC converter 10, and $f_4$(T, TON, Vin, Vout) is a predetermined function with T, TON, Vin, Vout as variables, where negative values are excluded.

The synchronous rectification phase shift operation unit 212 calculates $f_4$(T, TON, Vin, Vout) and $f_3$(T, TON, Vin, Vout), phase-shifts the reference signal and outputs the signal generated to the synchronous rectification logic operation unit 32. The synchronous rectification phase shift may be a zero current interval during discontinuous mode and a regeneration interval during continuous mode. An operation for a synchronous rectification phase shift thusly configured may be performed for each cycle of a reference signal.

Figure 13A:
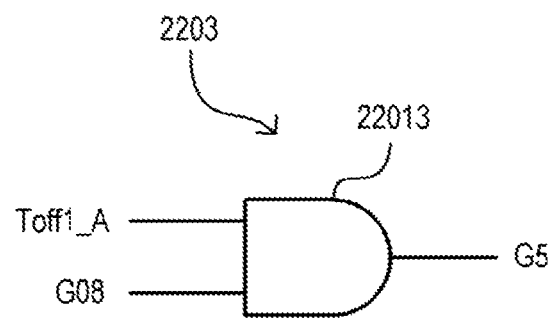
FIGS. 13A through 13D are diagrams illustrating examples of logic operation circuits according to the first embodiment of the present invention.
Figure 13B:
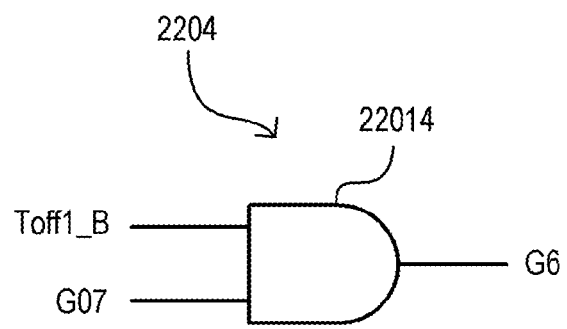

The control signal G5 is a logical conjunction of the signal Toff1_A and the signal G08 performed via the AND gate 22013 as illustrated in FIG. 13(A). The logic operation circuit 2203 is provided to the synchronous rectification logic operation unit 22. The control signal G6 is a logical conjunction of the signal Toff1_B and the signal G07 performed via the AND gate 22014 as illustrated in FIG. 13(B). The logic operation circuit 2204 is provided to the synchronous rectification logic operation unit 22.

Figure 13C:
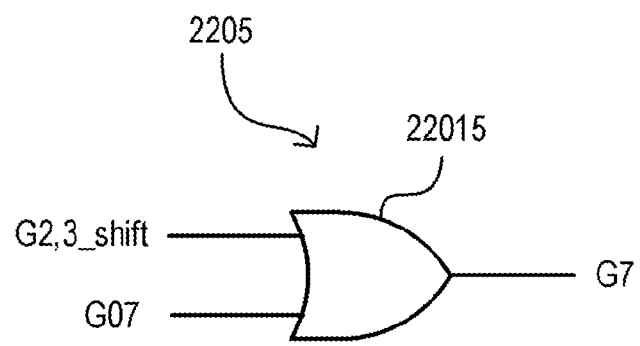
Figure 13D:
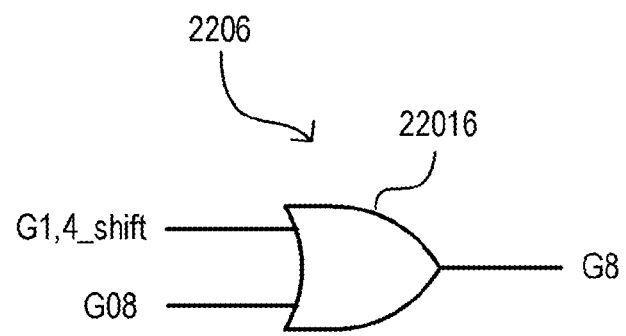

The control signal G7 is a logical disjunction of the signal G2,3_shift and the signal G07 performed via the OR gate 22015 as illustrated in FIG. 13(C). The logic operation circuit 2205 is provided to the synchronous rectification logic operation unit 22. The control signal G8 is a logical disjunction of the signal G1,4_shift and the signal G08 performed via the OR gate 22016 as illustrated in FIG. 13(D). The logic operation circuit 2206 is provided to the synchronous rectification logic operation unit 22.

The control signals G1-G8 thus generated are output from the control signal output unit 213. The reactor current IL1 resulting when the DC-DC converter 10 is driven by the control signals G1-G8 is illustrated at the lowest part of FIG. 12. The DC-DC converter 10, at this point, transitions through the below-listed states #31 through #36 in that order.

Figure 14:
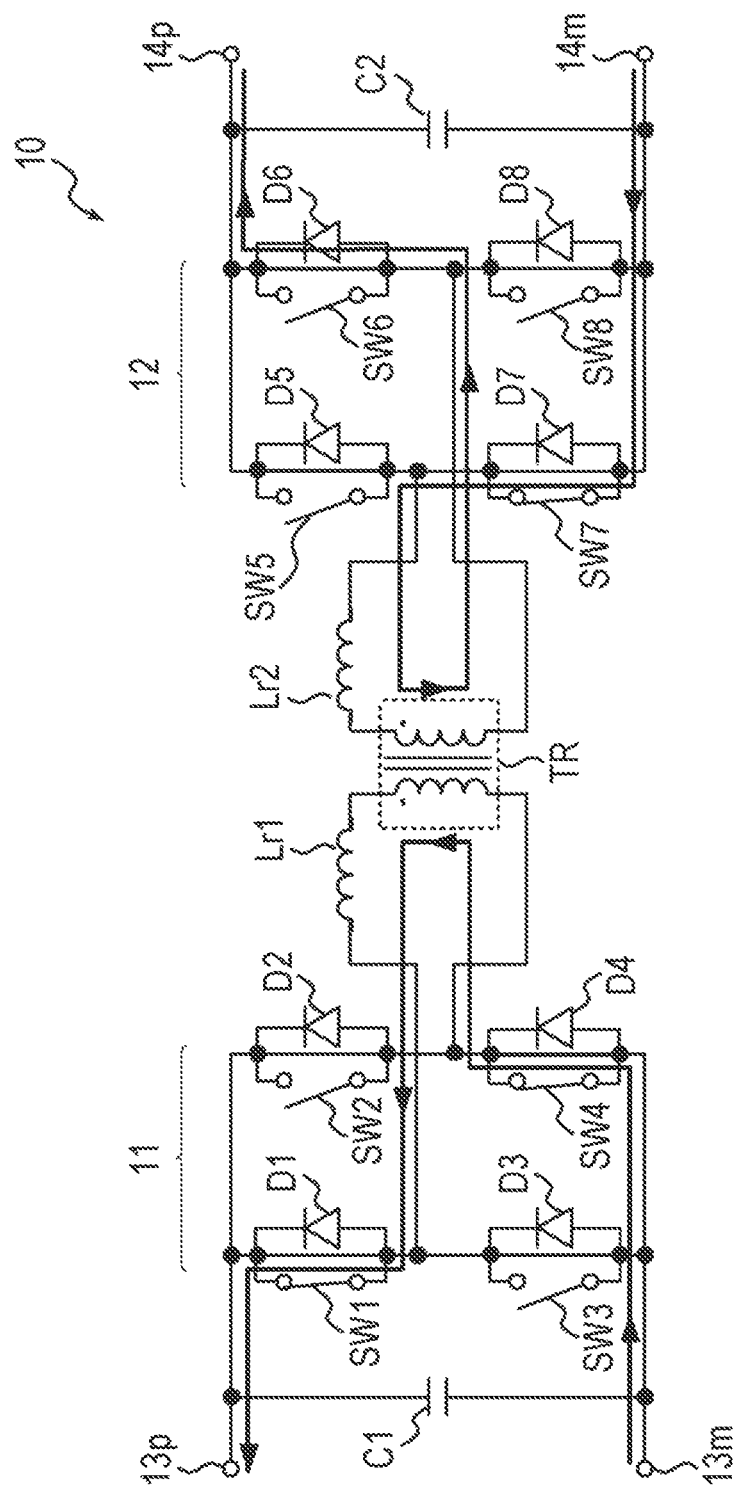
FIG. 14 is a diagram illustrating a current path in boost mode for a DC-DC converter according to first embodiment of the present invention.

In state #31, the switching elements SW1, SW4, and SW7 are ON and the other switching elements are OFF. At this point, the path of the current through the DC-DC converter 10 is as illustrated in FIG. 14.

Figure 15:
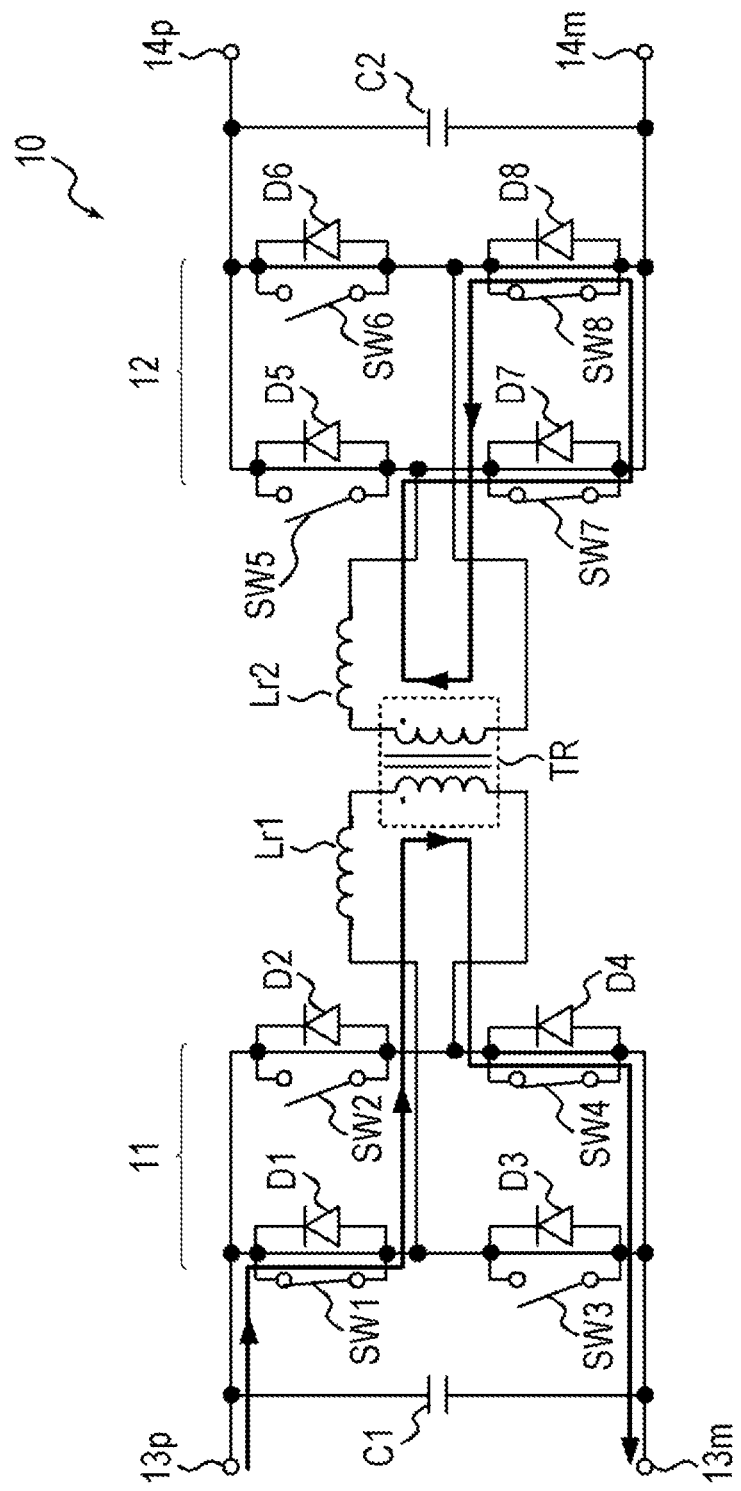
FIG. 15 is a diagram illustrating a current path in boost mode for a DC-DC converter according to first embodiment of the present invention.

In state #32, the switching elements SW1, SW4, SW7, and SW8 are ON and the other switching elements are OFF. At this point, the path of the current through the DC-DC converter 10 is as illustrated in FIG. 15.

Figure 16:
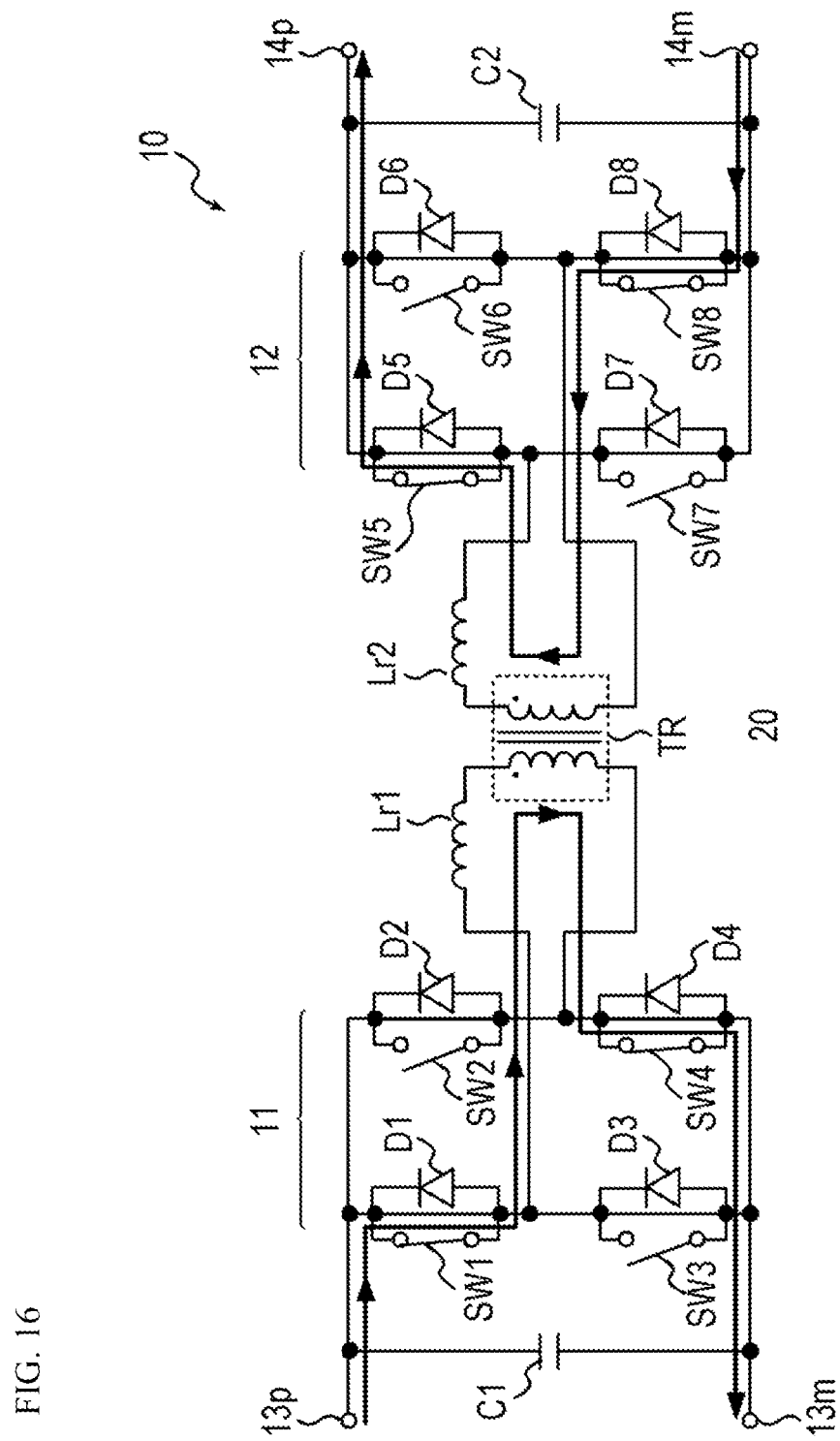
FIG. 16 is a diagram illustrating a current path in boost mode for a DC-DC converter according to first embodiment of the present invention.

In state #33, the switching elements SW1, SW4, SW5, and SW8 are ON and the other switching elements are OFF. At this point, the path of the current through the DC-DC converter 10 is as illustrated in FIG. 16.

Figure 17:
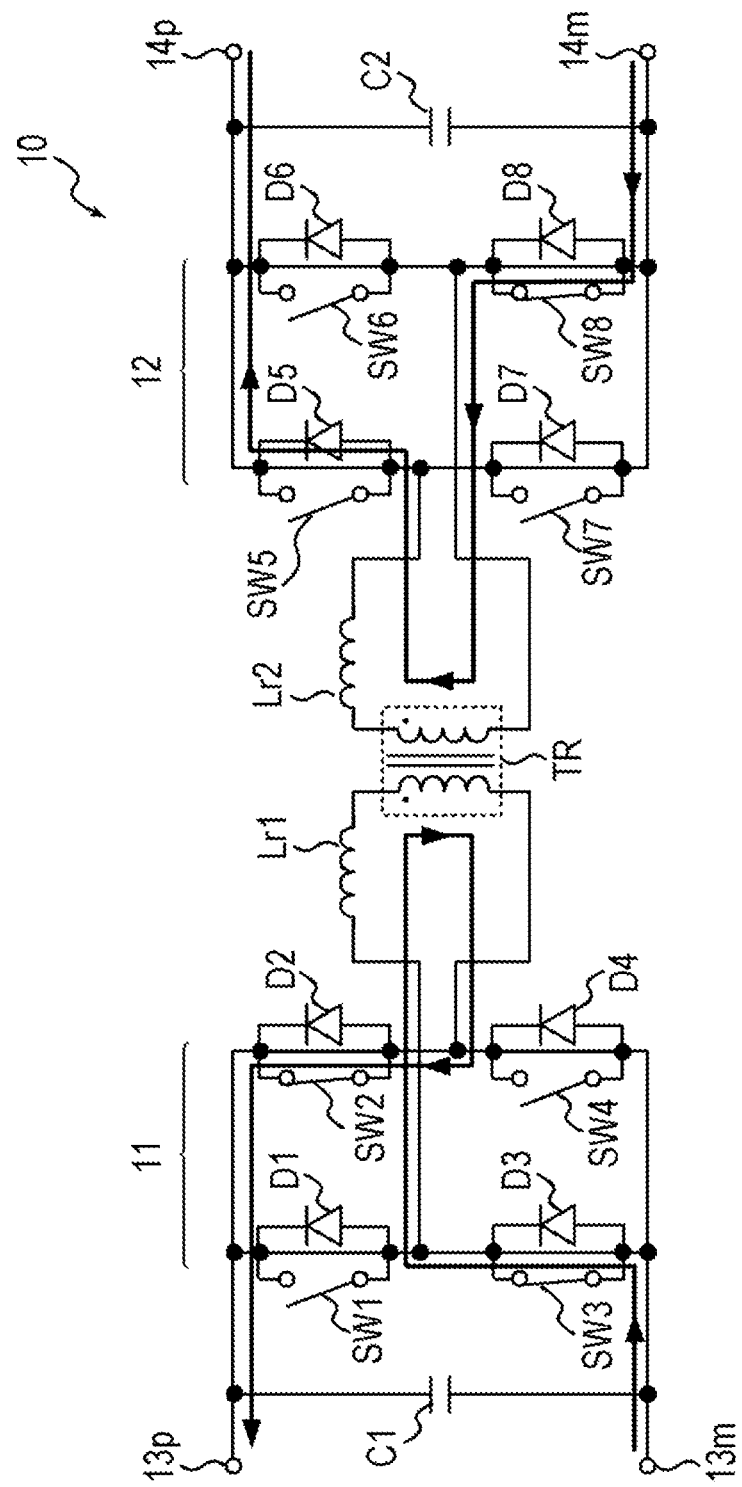
FIG. 17 is a diagram illustrating a current path in boost mode for a DC-DC converter according to first embodiment of the present invention.

In state #34, the switching elements SW2, SW3, and SW8 are ON and the other switching elements are OFF. At this point, the path of the current through the DC-DC converter 10 is as illustrated in FIG. 17.

Figure 18:
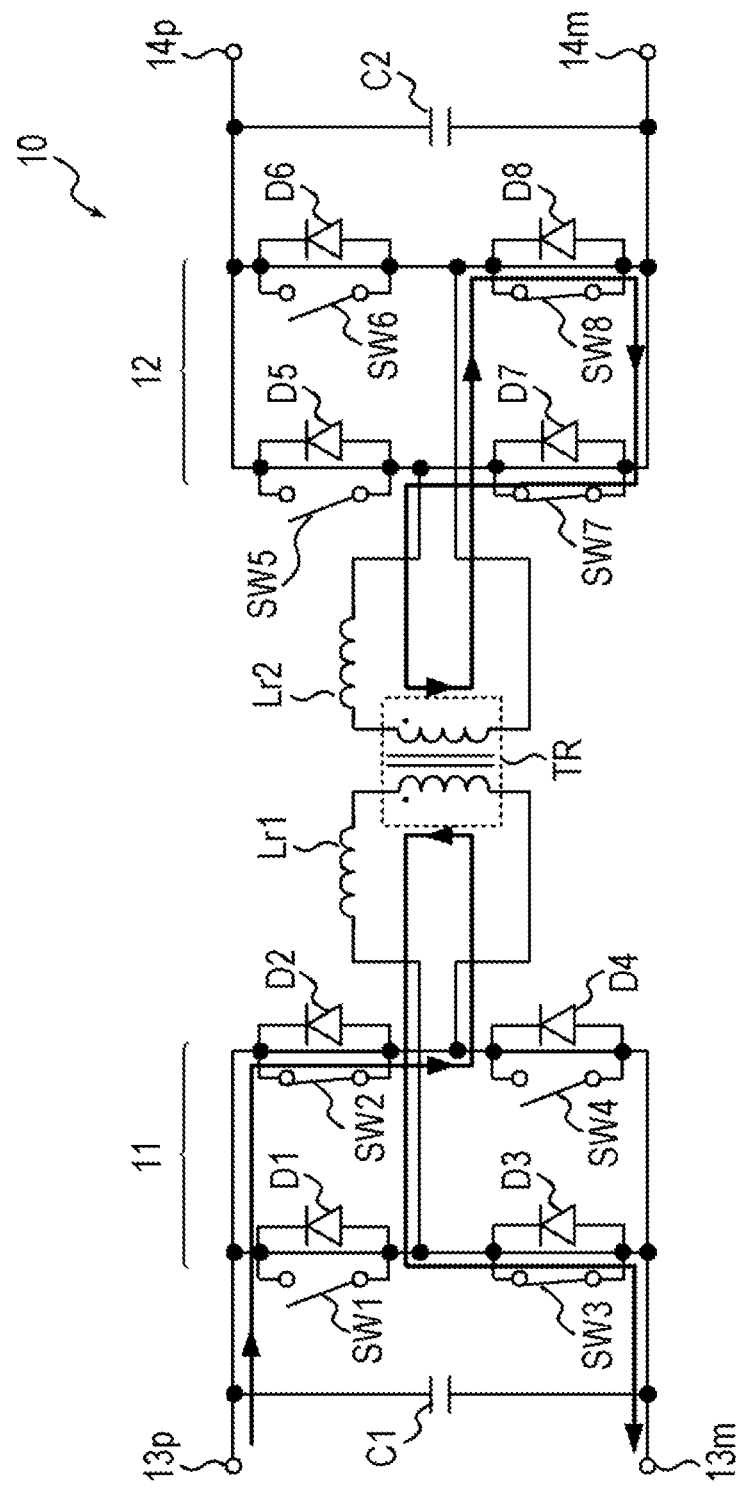
FIG. 18 is a diagram illustrating a current path in boost mode for a DC-DC converter according to first embodiment of the present invention.

In state #35, the switching elements SW2, SW3, SW7, and SW8 are ON and the other switching elements are OFF. At this point, the path of the current through the DC-DC converter 10 is as illustrated in FIG. 18.

Figure 19:
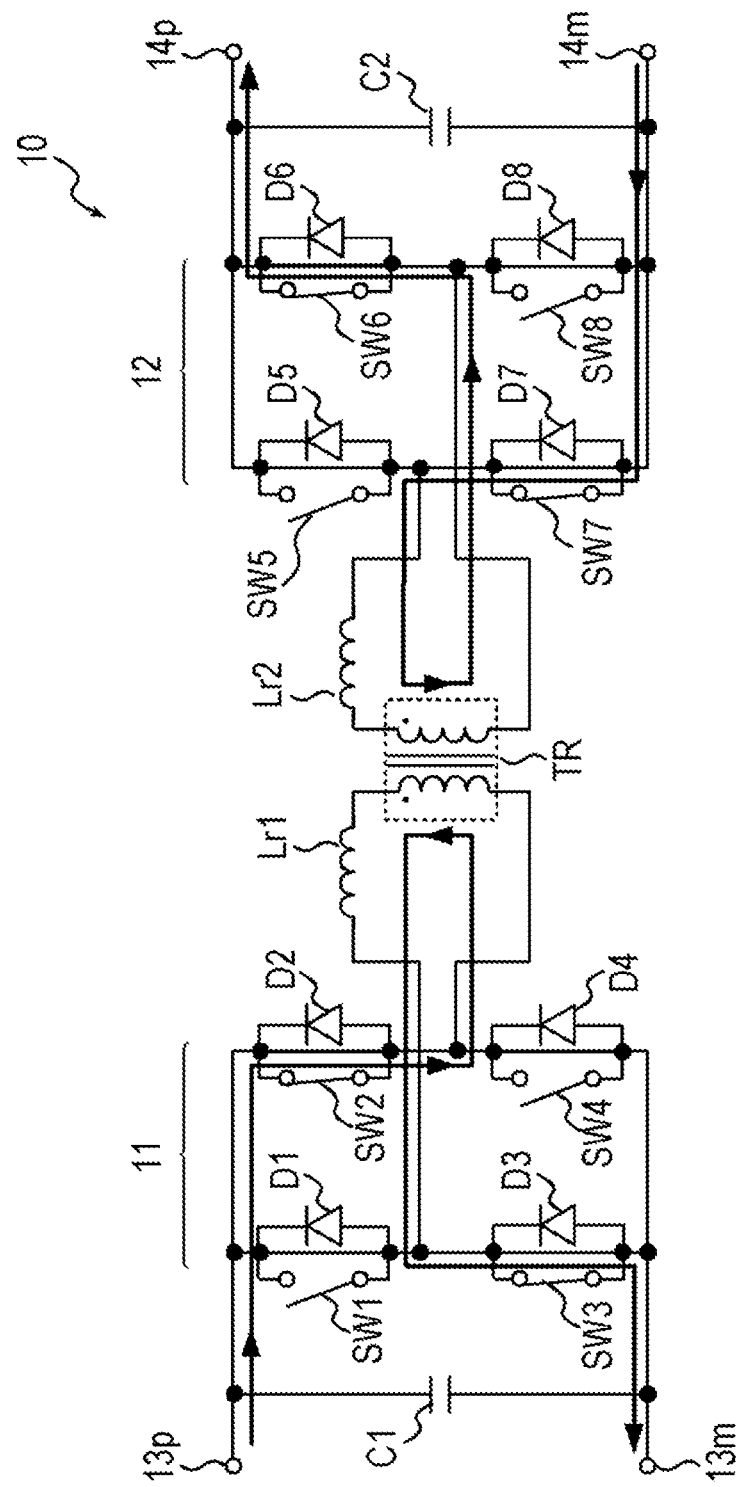
FIG. 19 is a diagram illustrating a current path in boost mode for a DC-DC converter according to first embodiment of the present invention.

In state #36, the switching elements SW2, SW3, SW6, and SW7 are ON and the other switching elements are OFF. At this point, the path of the current through the DC-DC converter 10 is as illustrated in FIG. 19.

Synchronous rectification is thus achieved in states #32, #33, #35, and #36. No synchronous rectification is achieved in states #31 and #34; however, the period of these states is short, with no great losses during these periods.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Boost Mode 2>

Figure 20:
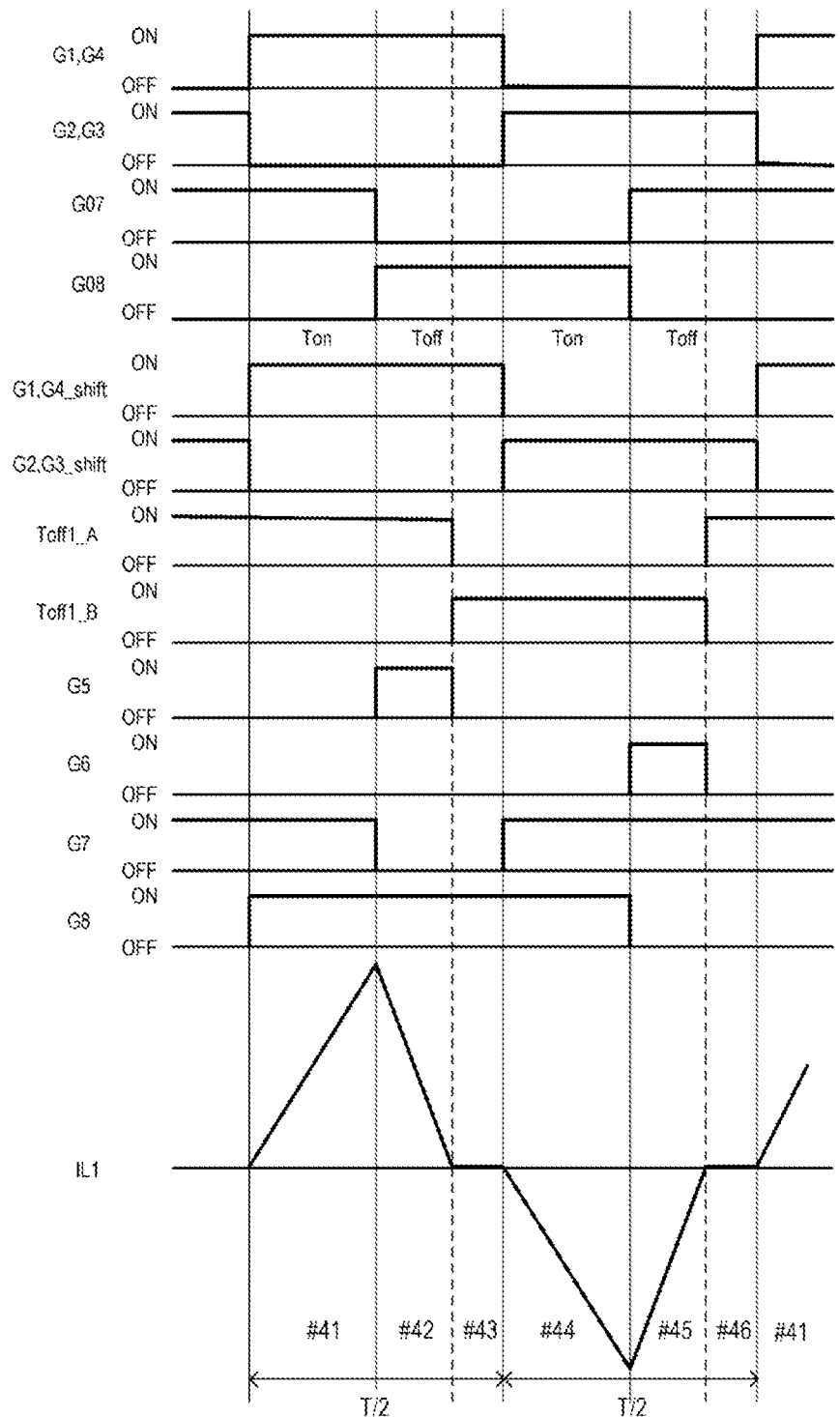
FIG. 20 is a timing chart for control signals for another boost mode of a DC-DC converter according to the first embodiment of the present invention.

FIG. 20 is a timing chart for signals used when the DC-DC converter 10 of this embodiment is operated as a boost converter. FIG. 20 is an example where the reactor current IL1 becomes discontinuous during the boost mode due to an input-output condition. The denotations of the signals conform to the descriptions made regarding boost mode 1. The control signals G1-G4 for the four switching elements SW1-SW4 in the first full-bridge circuit 11 on the primary side of the DC-DC converter 10 and the control signals G07 and G08 for SW7 and SW8 are taken as base control signals and the control signals generated therefrom for the four switching elements SW5-SW8 in the second full-bridge circuit 12 on the secondary side. The control signals among the base control signals for the switching elements SW1-SW4 in the first full-bridge circuit 11 are unchanged and are used unchanged as control signals, while the control signals for the switching elements SW5-SW8 in the second full-bridge circuit 12 are generated by processing, e.g., phase shifting relative to G2 among the base control signals, as well as a logic operation where G07, G08 which are base control signals for the switching elements SW7, SW8 are entered respectively as an input. The top four timing charts for G1-G4, and G07, G08 in FIG. 20 are for reference signals.

The signal G1,4_shift results from delaying the phase of the reference control signal G1 by exactly $f_3$(T, TON, Vin, Vout), and the signal G2,3_shift results from inverting the phase of G1,4_shift. Here, $f_3$(T, TON, Vin, Vout) is a predetermined function with T, TON, Vin, Vout as variables where the negative values are excluded.

The signal Toff1_A results from delaying the phase of the base control signal G2 by half cycle and further forwarding the resulting phase by exactly $f_4$(T, TON, Vin, Vout), while the signals Toff1_B results from inverting the phase of Toff1_A. Here, $f_4$(T, TON, Vin, Vout) is a predetermined function with the aforementioned variables where the negative values are excluded.

The control signal G5 is a logical conjunction of the signal Toff1_A and the signal G08 performed via the AND gate 22013 as illustrated in FIG. 13(A). The logic operation circuit 2203 is provided to the synchronous rectification logic operation unit 22. The control signal G6 is a logical conjunction of the signal Toff1_B and the signal G07 performed via the AND gate 22014 as illustrated in FIG. 13(B). The logic operation circuit 2204 is provided to the synchronous rectification logic operation unit 22.

The logic operation circuits 2203 and 2204 which generate the control signals G5 and G6 in boost mode 2 operate similarly as in boost mode 1.

The control signal G7 is a logical disjunction of the signal G2,3_shift and the signal G07 performed via the OR gate 22015 as illustrated in FIG. 13(C). The logic operation circuit 2205 is provided to the synchronous rectification logic operation unit 22. The control signal G8 is a logical disjunction of the signal G1,4_shift and the signal G08 performed via the OR gate 22016 as illustrated in FIG. 13(D). The logic operation circuit 2206 is provided to the synchronous rectification logic operation unit 22.

The logic operation circuits 2205 and 2206 which generate the control signals G7 and G8 in boost mode 2 operate similarly as in boost mode 1.

The control signals G1-G8 thus generated are output from the control signal output unit 213. The reactor current IL1 resulting when the DC-DC converter 10 is driven by the control signals G1-G8 is illustrated at the lowest part of FIG. 20. The DC-DC converter 10, at this point, transitions through the states #41 through #46 in that order. Descriptions of the current paths in the DC-DC converter 10 in each state are omitted; however, synchronous rectification is achieved except for when states #43 and #46 become discontinuous.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

While the signals G1 and G2 are taken as reference signals when generating the control signals used for synchronous control with respect to the above-described buck mode 1, buck mode 2, boost mode 1, and boost mode 2, the signals G3 and G4 may also be taken as reference signals.

Second Embodiment

A power converter device 1 and DC-DC converter 10 according to a second embodiment of the present invention is described below. Except for the configuration of a control unit 30, the DC-DC converter 10 of the second embodiment is the same as in the first embodiment; therefore, the same reference numerals are used and further explanations omitted with regard to the same configurations.

Figure 21:
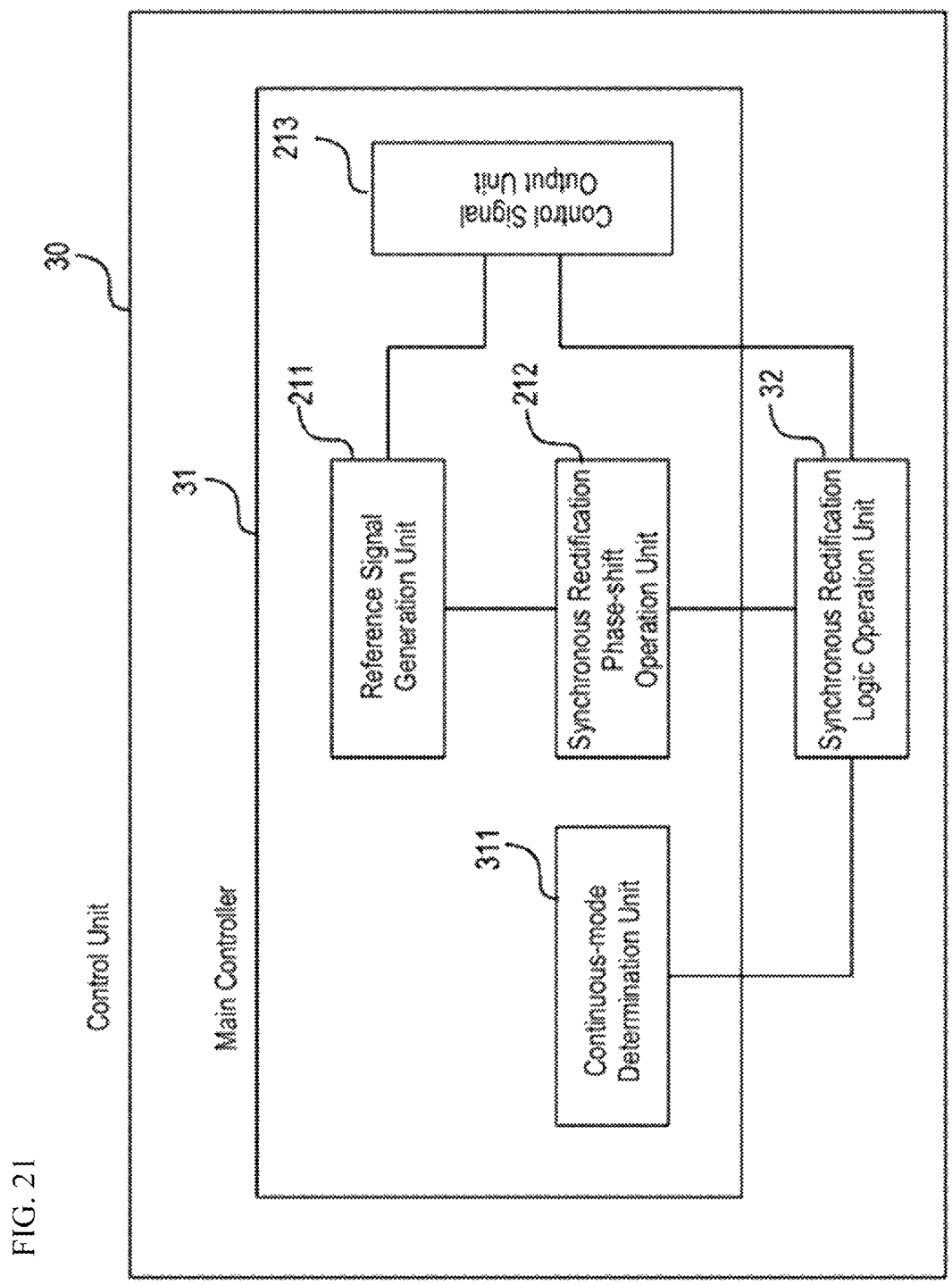
FIG. 21 is a block diagram of a control unit in the power converter device according to a second embodiment of the present invention.

FIG. 21 is a block diagram of the control unit 30. The control unit 30 includes a primary controller 31 configured from a microcontroller or the like, and a synchronous rectification logic operation unit 32 constituted by an analog circuit or small-factor CPU, or the like. The primary controller 31 also includes a reference signal generator 211, a synchronous rectification phase shift operation unit 212, and a control signal output unit 213, and a continuous-mode determination unit 311. The inclusion of the continuous-mode determination unit 311 in the primary controller 31 and the configuration of the synchronous rectification logic operation unit 32 differs from the control unit 20 according to the first embodiment; despite that, the remaining configurations are the same. The continuous-mode determination unit 311 acquires information such as the input-output condition of the power converter device 1, and uses a continuous-mode determination means, such as a table, to determine whether the DC-DC converter 10 is operating in continuous mode or in discontinuous mode. The continuous-mode determination unit 311 outputs a voltage equivalent to ON for a control signal (i.e., 1) when the result of the determination indicates continuous mode, and a voltage equivalent to OFF for a control signal (i.e., 0) when the result of the determination indicates discontinuous mode. The specific functions of these parts in the DC-DC converter 10 are described later.

<Buck Mode 1>

Figure 22:
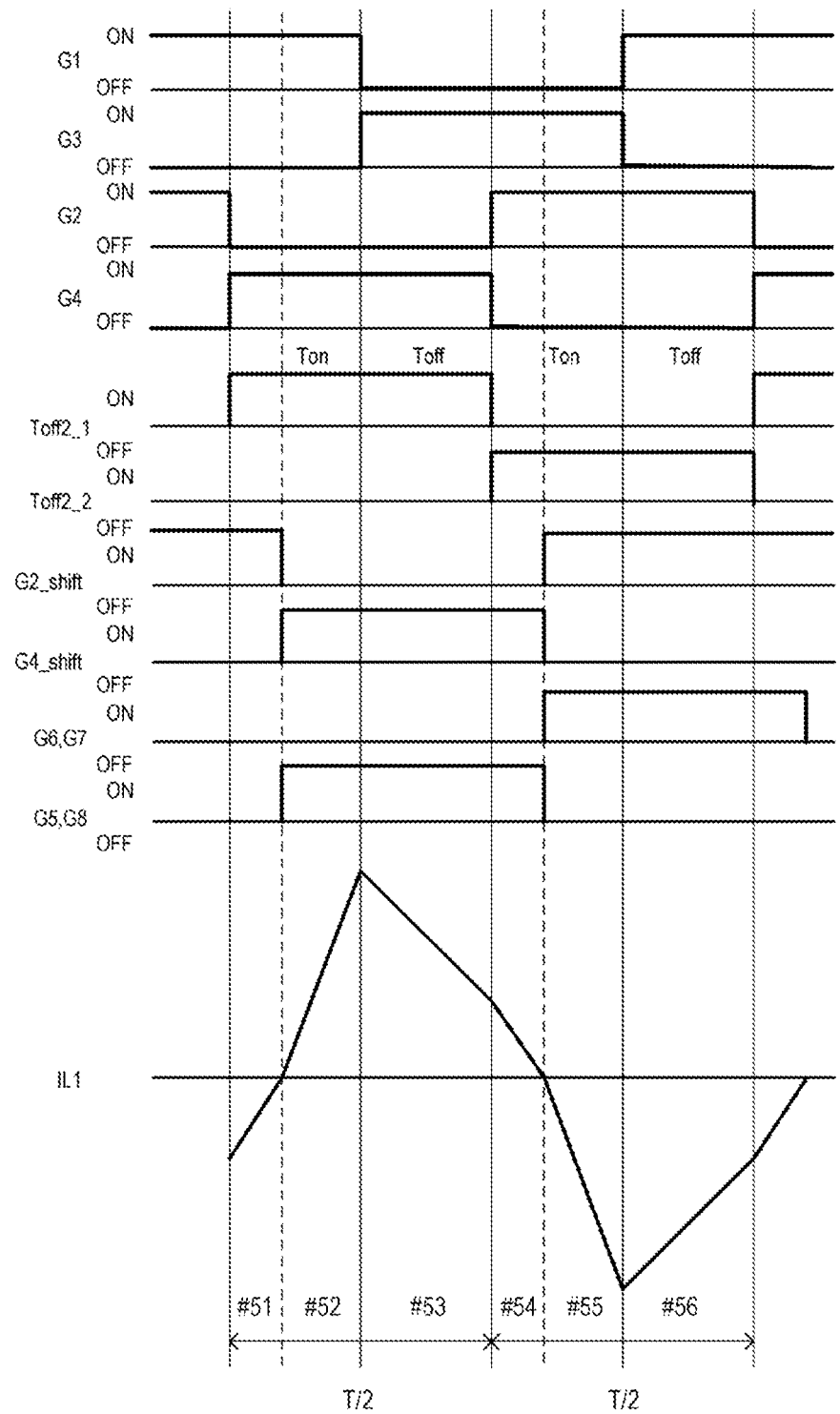
FIG. 22 is a timing chart for control signals for a buck mode of a DC-DC converter according to the second embodiment of the present invention.

FIG. 22 is a timing chart for signals used when the DC-DC converter 10 of this embodiment is operated as a buck converter. The control signals generated therefrom for the four switching elements SW5-SW8 in the second full-bridge circuit 12 on the secondary side are generated from the control signals G1-G4 for the four switching elements SW1-SW4 in the first full-bridge circuit 11 on the primary side of the DC-DC converter 10.

Therefore, the base control signals that would be subject to signal processing when generating synchronous rectification control signals are referred to as reference signals in particular. In the example illustrated in FIG. 3, the top four timing charts are base control signal timing charts.

The method for generating the signal Toff2_1, signal Toff2_2, signal G2_shift, and signal G4_shift is the same as the method used in buck mode 1 according to the first embodiment; therefore, a description thereof is omitted.

Figure 23A:
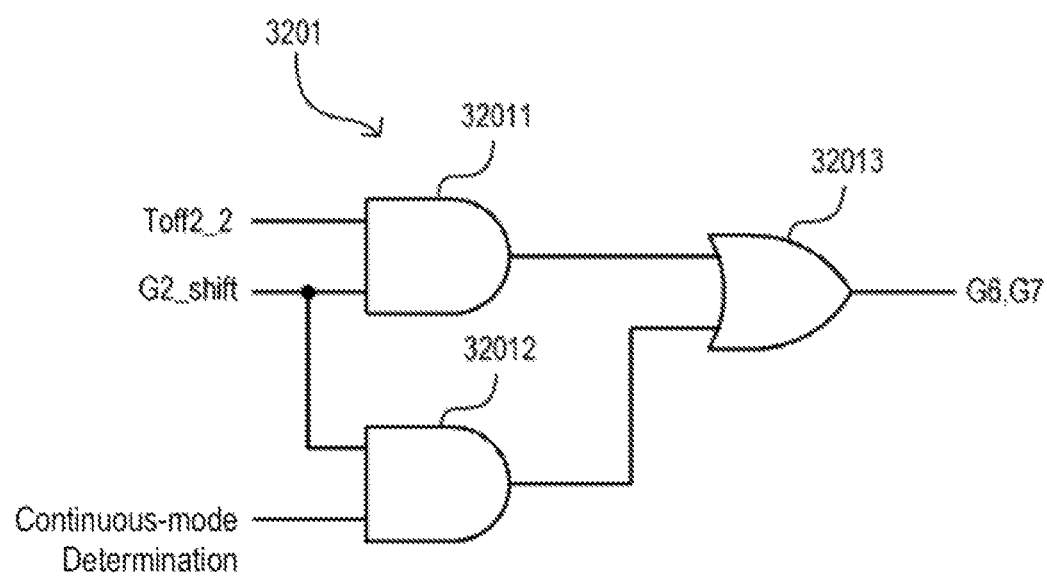
FIGS. 23A and 23B are diagrams illustrating examples of logic operation circuits according to the second embodiment of the present invention.
Figure 23B:
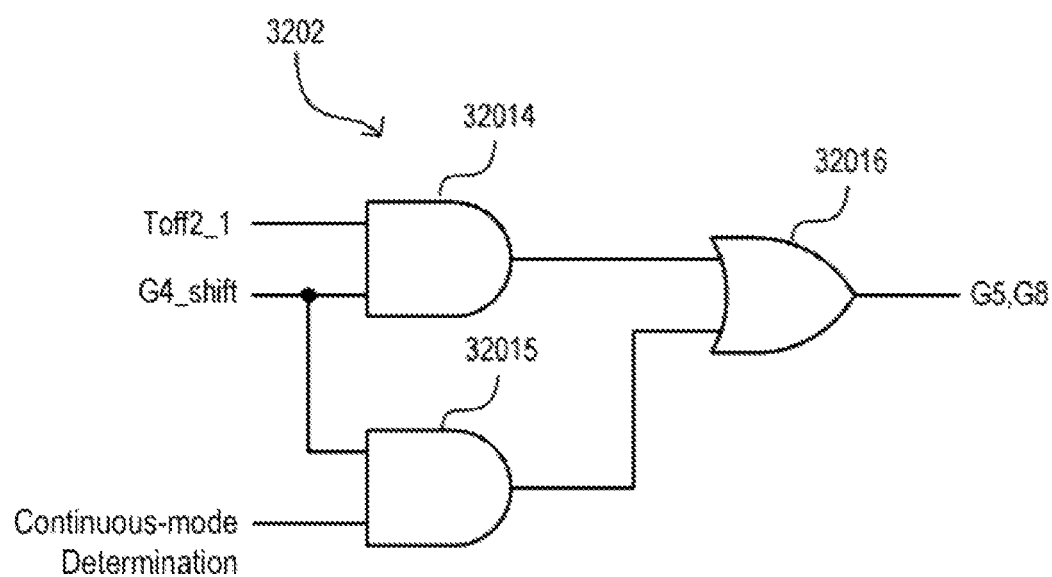

The control signals G6 and G7 are a logical disjunction of the output of a logical conjunction of the signal Toff2_2 and the signal G2_shift performed by the AND gate 32011, and output of the logical conjunction of the signal G2_shift and the continuous-mode determination signal performed by the AND gate 32012, the logical disjunction performed via the OR gate 32013 as illustrated in FIG. 23(A). The continuous-mode determination signal is an output signal from the above-described continuous-mode determination unit 311. The control signals G5 and G8 are a logical disjunction of the output of a logical conjunction of the signal Toff2_1 and the signal G4_shift performed by the AND gate 32014 and output of the logical conjunction of the signal G4_shift and the continuous-mode determination signal performed by the AND gate 32015, the logical disjunction performed via the OR gate 32016 as illustrated in FIG. 23(B). The logic operation circuits 3201 and 3202 are provided to the synchronous rectification logic operation unit 32.

The control signals G1-G8 thus generated are output from the control signal output unit 213. The reactor current IL1 resulting when the DC-DC converter 10 is driven by the control signals G1-G8 is illustrated at the lowest part of FIG. 22. The DC-DC converter 10, at this point, transitions through the states #51 through #56 in that order. Descriptions of the current paths in the DC-DC converter 10 in each state are omitted; however, synchronous rectification is achieved in all states #51 through #56 in accordance with whether the current is continuous or discontinuous without changing the switching pattern by entering the continuous-mode determination signal in the logic operation circuits 3201 and 3202.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Buck Mode 2>

Figure 24:
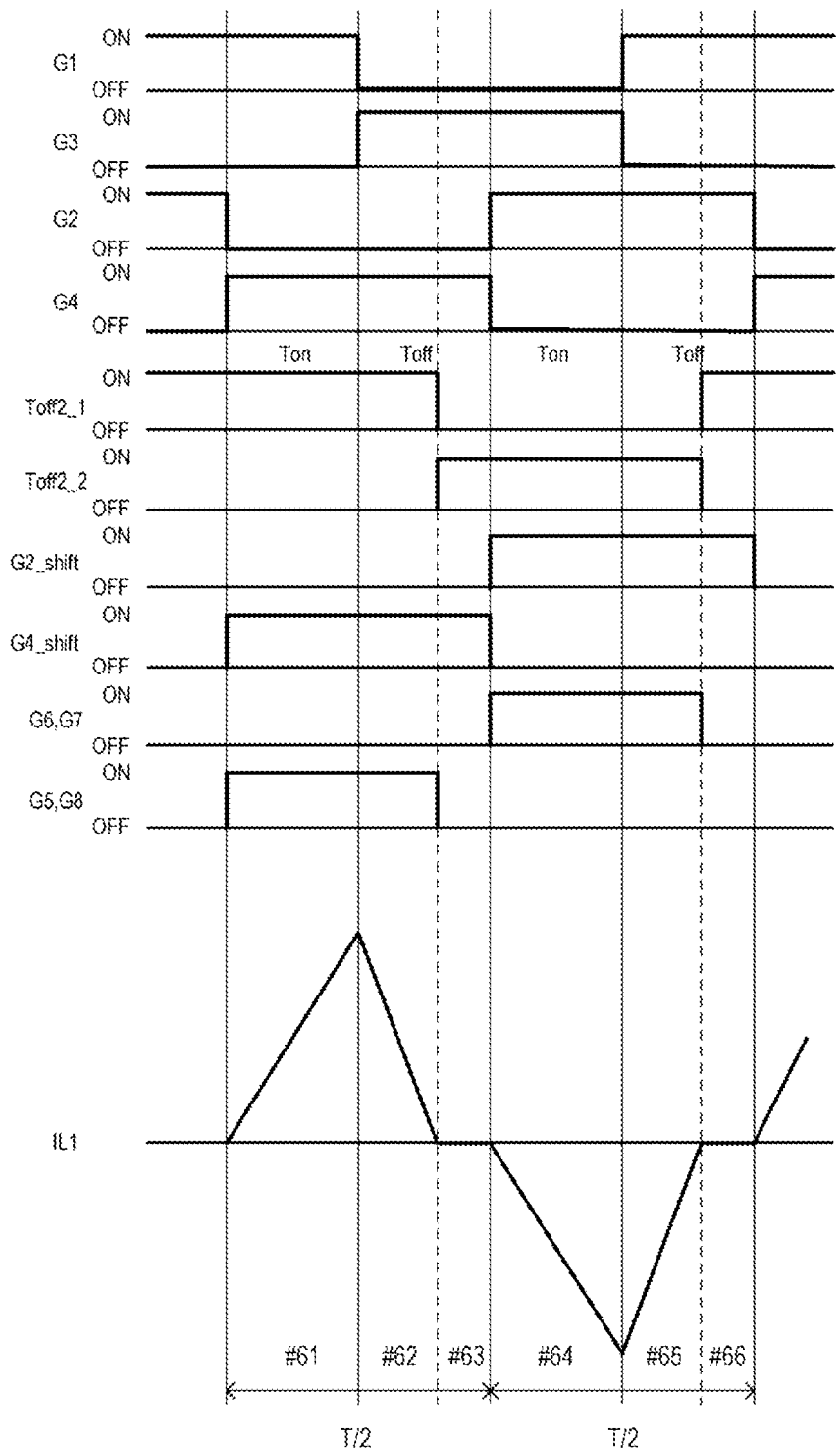
FIG. 24 is a timing chart for control signals for another buck mode of a DC-DC converter according to the second embodiment of the present invention.

FIG. 24 is an example where the reactor current IL1 becomes discontinuous during the buck mode due to an input-output condition.

In the example illustrated in FIG. 24, G2 is selected as the reference signal.

The method for generating the signal Toff2_1, signal Toff2_2, signal G2_shift, and signal G4_shift is the same as the method used in buck mode 1 according to the first embodiment; therefore, a description thereof is omitted. The control signals G6 and G7 are a logical disjunction of the output of a logical conjunction of the signal Toff2_2 and the signal G2_shift performed by the AND gate 32011, and output of the logical conjunction of the signal G2_shift and the continuous-mode determination signal performed by the AND gate 32012, the logical disjunction performed via the OR gate 32013 as illustrated in FIG. 23(A). The control signals G5 and G8 are a logical disjunction of the output of a logical conjunction of the signal Toff2_1 and the signal G4_shift performed by the AND gate 32014 and output of the logical conjunction of the signal G4_shift and the continuous-mode determination signal performed by the AND gate 32015, the logical disjunction performed via the OR gate 32016 as illustrated in FIG. 23(B). The logic operation circuits 3201 and 3202 which generate the control signals G5-G8 in buck mode 2 operate similarly as in buck mode 1.

The control signals G1-G8 thus generated are output from the control signal output unit 213. The reactor current IL1 resulting when the DC-DC converter 10 is driven by the control signals G1-G8 is illustrated at the lowest part of FIG. 24. The DC-DC converter 10, at this point, transitions through the states #61 through #66 in that order. The AND gates 32012 and 32015 in the logic operation circuits 3201 and 3202 are made to not function during discontinuous mode by entering the continuous-mode determination signal. Descriptions of the current paths in the DC-DC converter 10 in each state are omitted; however, synchronous rectification is achieved except for when states #63 and #66 become discontinuous.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Boost Mode 1>

Figure 25:
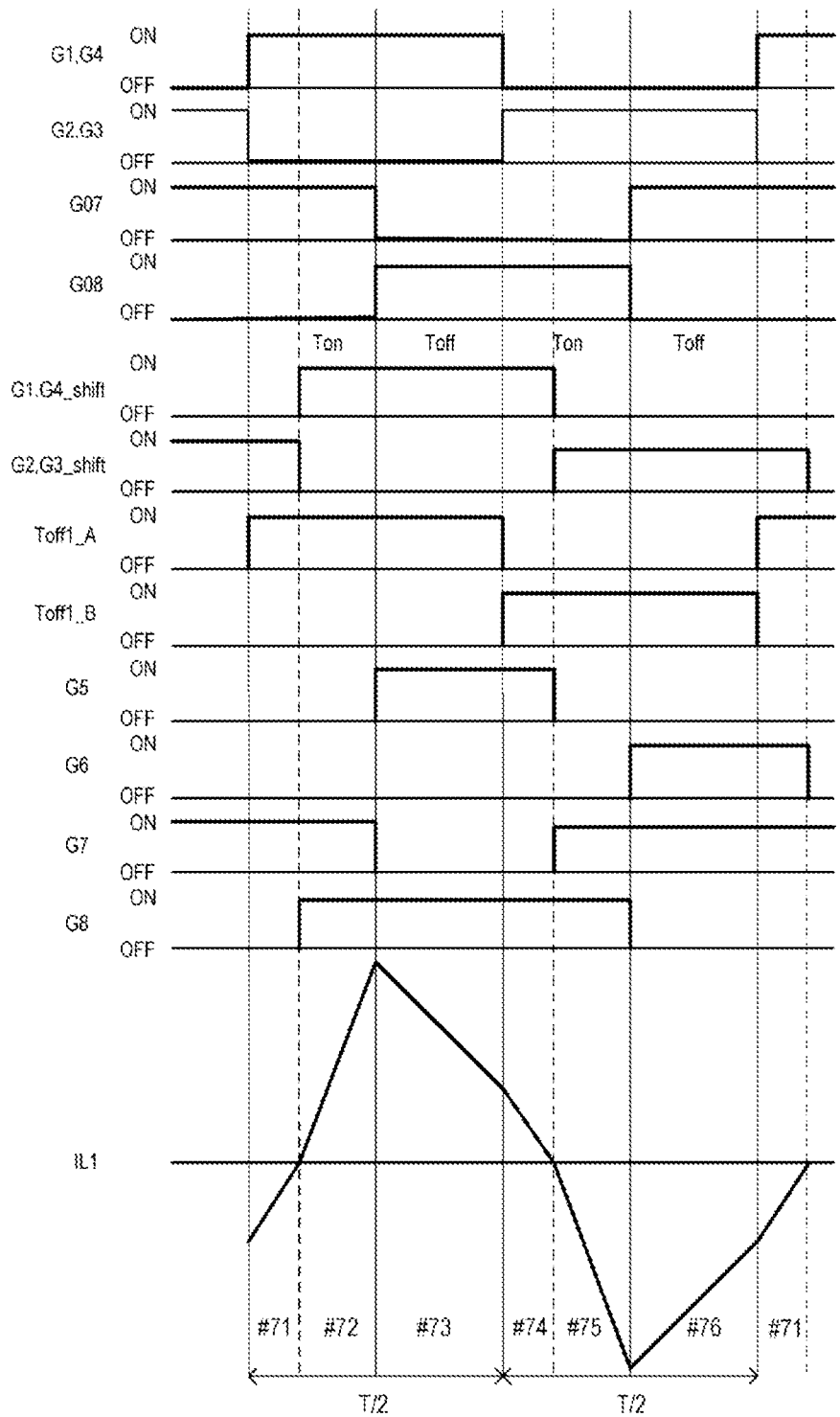
FIG. 25 is a timing chart for control signals for a boost mode of a DC-DC converter according to the second embodiment of the present invention.

FIG. 25 is a timing chart for signals used when the DC-DC converter 10 of the second embodiment is operated as a boost converter. The control signals G1-G4 for the four switching elements SW1-SW4 in the first full-bridge circuit 11 on the primary side of the DC-DC converter 10 and the control signals G07 and G08 for SW7 and SW8 are taken as base control signals and the control signals generated therefrom for the four switching elements SW5-SW8 in the second full-bridge circuit 12 on the secondary side. The control signals among the base control signals for the switching elements SW1-SW4 in the first full-bridge circuit 11 are unchanged and are used unchanged as control signals, while the control signals for the switching elements SW5-SW8 in the second full-bridge circuit 12 are generated by processing, e.g., phase shifting relative to G2 among the base control signals, as well as a logic operation where G07, G08 which are base control signals for the switching elements SW7, SW8 are entered respectively as an input. Therefore, the base control signals that would be subject to signal processing when generating synchronous rectification control signals are referred to as reference signals in particular. The top four timing charts for G1-G4, and G07, G08 in FIG. 25 are for reference signals.

The method for generating the signal G1,4_shift, signal G2,3_shift, signal Toff1_A and signal Toff1_B are the same as the method used in boost mode 1 according to the first embodiment; therefore, a description thereof is omitted.

Figure 26A:
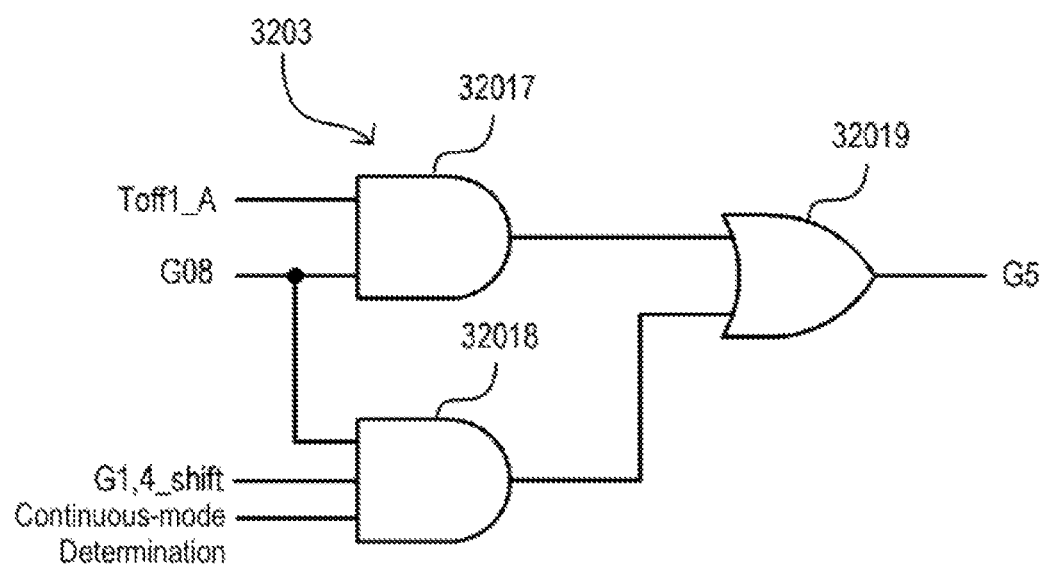
FIGS. 26A through 26D are diagrams illustrating examples of logic operation circuits according to the second embodiment of the present invention.

The control signal G5 is a logical disjunction of the output of a logical conjunction of the signal Toff1_A and the signal G08 performed by the AND gate 32017, and output of the logical conjunction of the signal G08, signal G1,4_shift, and the continuous-mode determination signal performed by the AND gate 32018, the logical disjunction performed via the OR gate 32019 as illustrated in FIG. 26(A). The logic operation circuit 3203 is provided to the synchronous rectification logic operation unit 32.

Figure 26B:
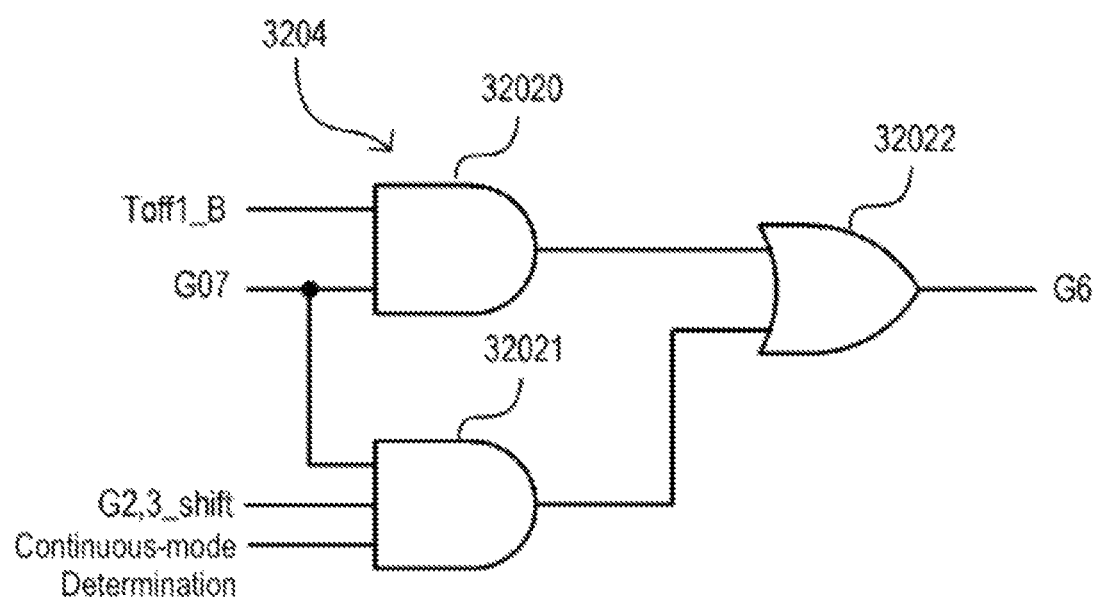

The control signal G6 is a logical disjunction of the output of the logical conjunction of the signal Toff1_B and the signal G07 performed by the AND gate 32020, and the logical conjunction of signal G07, signal G2,3_shift and the continuous-mode determination signal performed by the AND gate 32021, the logical disjunction performed via the OR gate 32022 as illustrated in FIG. 26(B). The logic operation circuit 3204 is provided to the synchronous rectification logic operation unit 32.

Figure 26C:
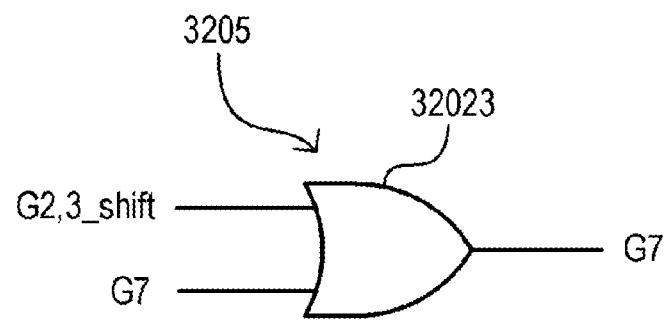
Figure 26D:
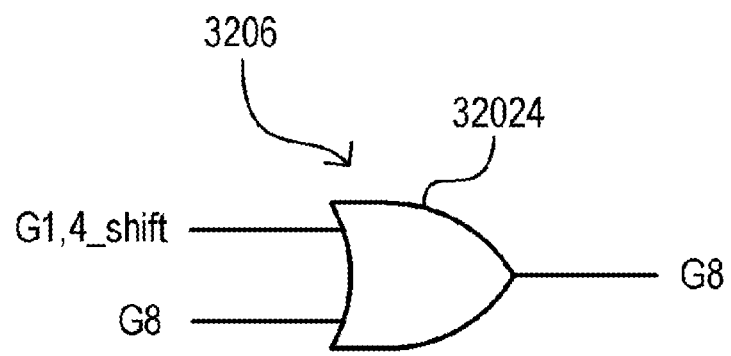

The control signal G7 is a logical disjunction of the signal G2,3_shift and the signal G07 performed via the OR gate 32023 as illustrated in FIG. 26(C). The logic operation circuit 3205 which includes this OR gate 32032 is provided to the synchronous rectification logic operation unit 32. The control signal G8 is a logical disjunction of the signal G1,4_shift and the signal G08 performed via the OR gate 32024 as illustrated in FIG. 26(D). The logic operation circuit 3206 which includes this OR gate 32034 is provided to the synchronous rectification logic operation unit 32.

The control signals G1-G8 thus generated are output from the control signal output unit 213. The reactor current IL1 resulting when the DC-DC converter 10 is driven by the control signals G1-G8 is illustrated at the lowest part of FIG. 25. The DC-DC converter 10, at this point, transitions through the states #71 through #76 in that order. Descriptions of the current paths in the DC-DC converter 10 in each state are omitted; however, synchronous rectification is achieved in all states #71 through #76 in accordance with whether the current is continuous or discontinuous without changing the switching pattern by entering the continuous-mode determination signal in the logic operation circuits 3201 and 3202.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

<Boost Mode 2>

Figure 27:
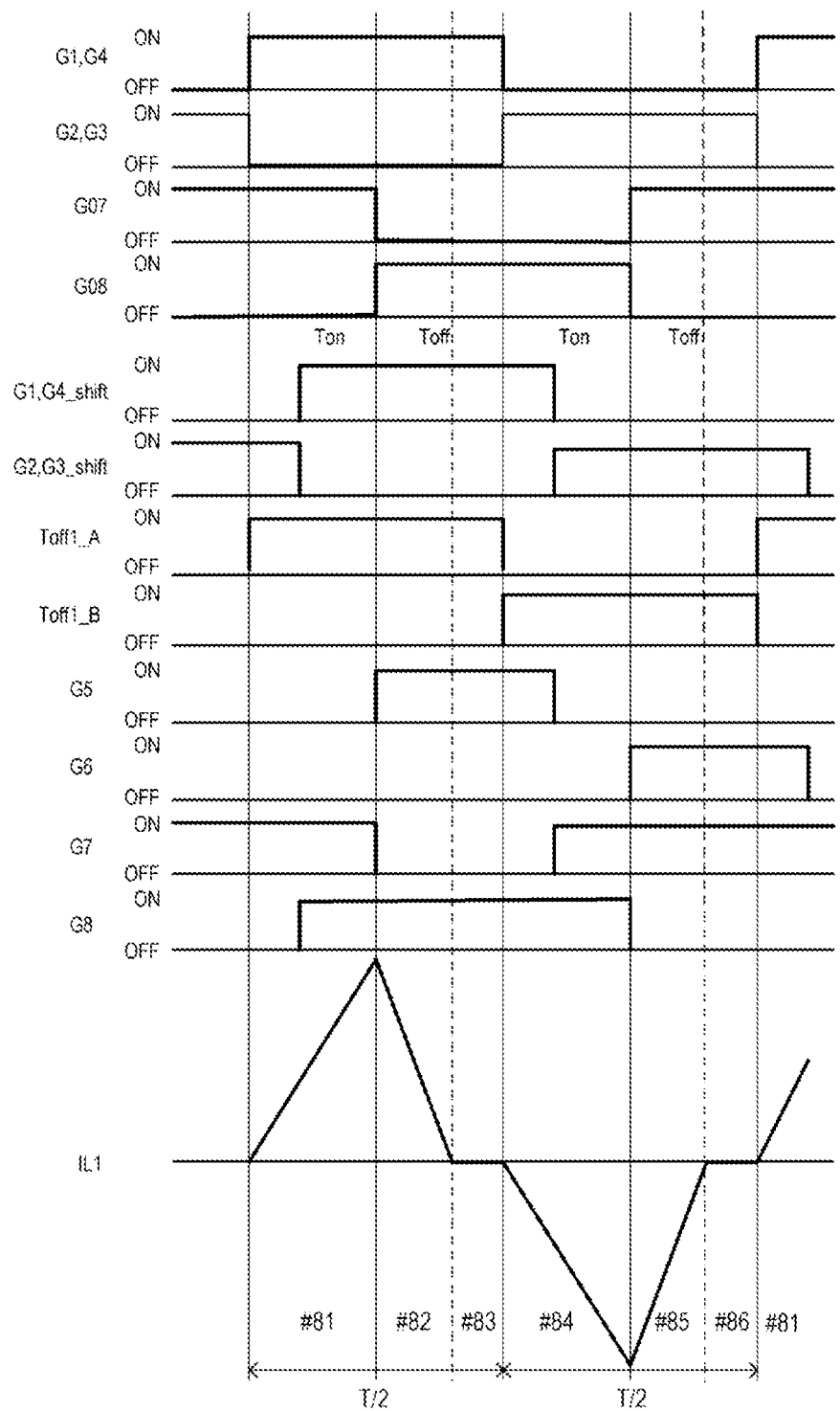
FIG. 27 is a timing chart for control signals for another boost mode of a DC-DC converter according to the second embodiment of the present invention.

FIG. 27 is an example where the reactor current IL1 becomes discontinuous during the boost mode due to an input-output condition.

The method for generating the signal G1,4_shift, signal G2,3_shift, signal Toff1_A and signal Toff1_B are the same as the method used in boost mode 1 according to the first embodiment; therefore, a description thereof is omitted. The method for generating the control signals G5-G8 are also the same as the method used in boost mode 1 in the second embodiment; therefore, a description thereof is omitted.

The control signals G1-G8 thus generated are output from the control signal output unit 213. The reactor current IL1 resulting when the DC-DC converter 10 is driven by the control signals G1-G8 is illustrated at the lowest part of FIG. 27. The DC-DC converter 10, at this point, transitions through the states #81 through #86 in that order. Descriptions of the current paths in the DC-DC converter 10 in each state are omitted; however, the AND gates 32018 and 32021 are configured to not function during discontinuous mode by entering the continuous-mode determination signal in the logic operation circuits 3203 and 3204. Descriptions of the current paths in the DC-DC converter 10 in each state are omitted; however, synchronous rectification is achieved except for when states #83 and #86 become discontinuous.

A power converter device 1 that thus includes the DC-DC converter 10 can generate the control signals that perform synchronous control of the switching elements SW5-SW8 from reference signals via a phase shift operation and logic operations in the logic operation circuit and no external Schottky barrier diode, high-performance CPU, or the like are needed; therefore, synchronous rectification can be implemented and a highly efficient power converter device can be provided while minimizing cost and without causing an increase in the circuit area.

Modification Examples

Taking either of the first full-bridge circuit 11 or the second full-bridge circuit 12 as the secondary side can be determined by providing the zero current/regeneration operation state to the synchronous rectification logic operation units 22, 32.

An isolated bidirectional DC-DC converter 10 is given as the example in the above-described first embodiment and second embodiment; however, the present invention may be applied to a bidirectional boost chopper or bidirectional multi-function chopper regardless of whether the device is an isolated or non-isolated type.

To allow for comparisons between the constituent elements of the present invention and the configuration in the embodiment, the constituent elements of the invention are described together with reference numerals in the drawings.

<Invention 1>

A power converter device (1) including: a capacitor (C1) for smoothing a voltage entering therein;
a first switching unit (11);
a second switching unit (12);
a reactor (Lr1, Lr2);
an isolated transformer (TR);
a second capacitor (C2);
a controller (20) for controlling the switching of the first switching unit (11) and the second switching unit (12); and
the controller (20) converting direct-current power to alternating-current power via the reactor (Lr1, Lr2) and the isolated transformer (TR) and converting said alternating-current power to direct-current power via the second capacitor (C2) wherein,
the controller (20) includes
a phase-shift operation unit (212) for taking at least any first switching control signal for controlling switching of the first switching unit (SW1-SW4) as a reference signal, and
calculating a phase shift that shifts the phase of the reference signal; and
a logic operation unit (22) for performing a logic operation that takes at least one of the signals resulting from shifting the phase of the reference signal by exactly the phase shift as input and outputting a second switching control signal for controlling switching of the second switching unit (SW5-SW8).

DESCRIPTION OF SYMBOLS

1: Power converter device
11: First full-bridge circuit
12: Second full-bridge circuit
C1, C2: Capacitor
Lr1, Lr2: Reactor
TR: Isolated transformer
SW1-SW8: Switching element
20: Control Unit
22: Synchronous rectification logic operation unit
212: Synchronous rectification phase-shift operation unit

The invention claimed is:
1. A power converter device comprising:
a capacitor for smoothing a voltage entering therein;
a first switching unit as a full-bridge circuit provided with a first leg having a first switching element and a third switching element that are connected in series and a second leg having a second switching element and a fourth switching element that are connected in series;
a second switching unit as a full-bridge circuit provided with a third leg having a fifth switching element and a seventh switching element that are connected in series and a fourth leg having a sixth switching element and an eighth switching element that are connected in series;
a reactor;
an isolated transformer;
a second capacitor; and
a controller for controlling the switching of the first switching unit and the second switching unit; and
the controller converting direct-current power to alternating-current power via the reactor and the isolated transformer and converting said alternating-current power to direct-current power via the second capacitor wherein, the controller includes a phase-shift operation unit for taking a control signal G2 for controlling switching of the second switching element as a reference signal, and
calculating f1(T, TON, Vin, Vout) and f2(T, TON, Vin, Vout) as phase shifts that shifts the phase of the reference signal G2 wherein f1 and f2 are predetermined functions with T, TON, TOFF, Vin and Vout where T represents a cycle, TON is an ON period where control signals G1 and G4 for controlling switching of the first switching element and the fourth switching element respectively are on simultaneously, TOFF is an ON period where the reference signal G2 and a control signal G3 for controlling switching of the third switching element are on simultaneously, Vin is an input voltage of the power converter, Vout is an output voltage of the power converter where negative values are excluded; and a logic operation unit for performing a logic operation that includes an AND gate outputting control signals G6 and G7 for controlling switching of the sixth switching element and the seventh switching element respectively by a logical conjunction of a signal Toff2_2 and a signal G2_shift where the signal Toff2_2 results from inverting a phase of a signal Toff2_1 resulting from delaying a phase of the reference signal G2 by half cycle and further forwarding the resulting phase by exactly f1(T, TON, Vin, Vout) and the signal G2_shift results from delaying a phase of the reference signal G2 by exactly f2(T, TON, Vin, Vout), and an AND gate outputting control signals G5 and G8 for controlling switching the fifth switching element and the eighth switching element respectively by a logical conjunction of the signal Toff2_1 and a signal G4_shift resulting from inverting a phase of G2_shift.

2. A power converter device comprising:

a capacitor for smoothing a voltage entering therein;

a first switching unit as a full-bridge circuit provided with a first leg having a first switching element and a third switching element that are connected in series and a second leg having a second switching element and a fourth switching element that are connected in series;

a second switching unit as a full-bridge circuit provided with a third leg having a fifth switching element and a seventh switching element that are connected in series and a fourth leg having a sixth switching element and an eighth switching element that are connected in series;

a reactor;

an isolated transformer;

a second capacitor; and a controller for controlling the switching of the first switching unit and the second switching unit; and the controller converting direct-current power to alternating-current power via the reactor and the isolated transformer and converting said alternating-current power to direct-current power via the second capacitor wherein, the controller includes a phase-shift operation unit for taking control signals G1 and G2 for controlling switching of the first switching element and the second switching element respectively as reference signals, and
calculating f3(T, TON, Vin, Vout) and f4(T, TON, Vin, Vout) as phase shifts that shift the phase of the reference signals G1 and G2 respectively, wherein f3 and f4 are predetermined functions with T, TON, TOFF, Vin and Vout where T represents a cycle, TON is an ON period where the reference signal G1, a control signal G4 for controlling switching of the fourth switching element and a basic control signal G07 that is a basis for generating a control signal G7 for controlling switching of the seventh switching element are on simultaneously, TOFF is an ON period where the reference signal G1, the control signal G4, and a basic control signal G08 that is a basis for generating a control signal G8 for controlling switching of the eighth switching element are on simultaneously, Vin is an input voltage of the power converter, Vout is an output voltage of the power converter where negative values are excluded; and a logic operation unit for performing a logic operation that includes an AND gate outputting a control signal G5 for controlling switching the fifth switching element by a logical conjunction of a signal Toff1_A and the basic control signal G08 where the signal Toff1_A results from delaying a phase of the reference signal G2 by half cycle and further forwarding the resulting phase by exactly f4 (T, TON, Vin, Vout), an AND gate outputting a control signal G6 for controlling switching the sixth switching element by a logical conjunction of a signal Toff1_B and the basic control signal G07 where the signal Toff1_B results from inverting a phase of Toff1_A, an OR gate outputting the control signal G7 by a logical disjunction of a signal G2,3_shift and the basic control signal G07 where the signal G2,3_shift results from inverting the phase of G1,4_shift resulting from delaying a phase of the reference signal G1 by exactly f3 (T, TON, Vin, Vout), and an OR gate outputting the control signal G8 by a logical disjunction of the signal G1,4_shift and the basic control signal G08.

3. A power converter device comprising:

a capacitor for smoothing a voltage entering therein;

a first switching unit as a full-bridge circuit provided with a first leg having a first switching element and a third switching element that are connected in series and a second leg having a second switching element and a fourth switching element that are connected in series;

a second switching unit as a full-bridge circuit provided with a third leg having a fifth switching element and a seventh switching element that are connected in series and a fourth leg having a sixth switching element and an eighth switching element that are connected in series;

a reactor;

an isolated transformer;

a second capacitor; and a controller for controlling the switching of the first switching unit and the second switching unit; and the controller converting direct-current power to alternating-current power via the reactor and the isolated transformer and converting said alternating-current power to direct-current power via the second capacitor wherein, the controller includes a phase-shift operation unit for taking a control signal G2 for controlling switching of the second switching element as a reference signal, and
calculating f1(T, TON, Vin, Vout) and f2(T, TON, Vin, Vout) as phase shifts that shift the phase of the reference signal G2, wherein f1 and f2 are predetermined functions with T, TON, TOFF, Vin and Vout where T represents a cycle, TON is an ON period where control signals G1 and G4 for controlling switching of the first switching element and the fourth switching element respectively are on simultaneously, TOFF is an ON period where the reference signal G2 and a control signal G3 for controlling switching of the third switching element are on simultaneously, Vin is an input voltage of the power converter, Vout is an output voltage of the power converter where negative values are excluded;

a continuous-mode determination unit for determining whether the current flowing through the reactor is continuous or is discontinuous and outputting a continuous-mode determination signal according to the result of determination; and a logic operation unit for performing a logic operation that includes an OR gate outputting control signals G6 and G7 for controlling switching of the sixth switching element and the seventh switching element by a logical disjunction of an output of a logical conjunction of a signal Toff2_2 and a signal G2_shift performed by an AND gate where the signal Toff2_2 results from inverting a phase of Toff2_1 resulting from delaying the phase of the reference signal G2 by half cycle and further forwarding the resulting phase by exactly f1(T, TON, Vin, Vout) and the signal G2_shift results from delaying a phase of the reference signal G2 by exactly f2(T, TON, Vin, Vout), and an output of a logical conjunction of the signal G2_shift and the continuous-mode determination signal performed by an AND gate, and an OR gate outputting a control signal G5 for controlling switching the fifth switching element and the control signal G8 by logical disjunction of an output of a logical conjunction of the signal Toff2_1 and a signal G4_shift performed by an AND gate where the signal G4_shift results from inverting a phase of G2_shift and an output of a logical conjunction of the G4_shift and the continuous-mode determination signal performed by an AND gate.

4. A power converter device comprising: a capacitor for smoothing a voltage entering therein;

a first switching unit as a full-bridge circuit provided with a first leg having a first switching element and a third switching element that are connected in series and a second leg having a second switching element and a fourth switching element that are connected in series;

a second switching unit as a full-bridge circuit provided with a third leg having a fifth switching element and a seventh switching element that are connected in series and a fourth leg having a sixth switching element and an eighth switching element that are connected in series;

a reactor;

an isolated transformer;

a second capacitor; and a controller for controlling the switching of the first switching unit and the second switching unit; and the controller converting direct-current power to alternating-current power via the reactor and the isolated transformer and converting said alternating-current power to direct-current power via the second capacitor wherein, the controller includes a phase-shift operation unit for taking control signals G1 and G2 for controlling switching of the first switching element and the second switching element respectively as reference signals, and calculating f3(T, TON, Vin, Vout) and f4(T, TON, Vin, Vout) as phase shifts that shift the phase of the reference signals G1 and G2 respectively, wherein f3 and f4 are predetermined functions with T, TON, TOFF, Vin and Vout where T represents a cycle, TON is an ON period where the reference signal G1, a control signal G4 for controlling switching of the fourth switching element and a basic control signal G07 that is a basis for generating a control signal G7 for controlling switching of the seventh switching element are on simultaneously, TOFF is an ON period where the reference signal G1, the control signal G4 and a basic control signal G08 that is a basis for generating a control signal G8 for controlling switching of the eighth switching element are on simultaneously, Vin is an input voltage of the power converter, Vout is an output voltage of the power converter where negative values are excluded;

a continuous-mode determination unit for determining whether the current flowing through the reactor is continuous or is discontinuous and outputting a continuous-mode determination signal according to the result of determination; and a logic operation unit for performing a logic operation that includes an OR gate outputting the control signal G5 for controlling switching of the fifth switching element by a logical disjunction of an output of a logical conjunction of a signal Toff1_A and the basic control signal G08 performed by an AND gate where the signal Toff1_A results from delaying a phase of the reference signal G2 by half cycle and further forwarding the resulting phase by exactly f4(T, TON, Vin, Vout), and an output of a logical conjunction of the basic control signal G08, a signal G1,4_shift, and the continuous-mode determination signal performed by an AND gate where a signal G1,4_shift results from delaying a phase of the reference signal G1 by exactly f3(T, TON, Vin, Vout), an OR gate outputting a control signal G6 for controlling switching the sixth switching element by a logical disjunction of an output of a logical conjunction of a signal Toff1_B and the basic control signal G07 performed by an AND gate where the signal Toff1_B results from inverting a phase of Toff1_A and an output of a logical conjunction of the basic control signal G07, a signal G2,3_shift, and the continuous-mode determination signal performed by an AND gate where the signal G2,3_shift results from inverting the phase of G1,4_shift, an OR gate outputting the control signal G7 by a logical disjunction of the signal G2,3_shift and the basic control signal G07, and an OR gate outputting the control signal G8 by a logical disjunction of the signal G1,4_shift and the basic control signal G08.

* * * * *